United States Patent
Kaufman et al.

(10) Patent No.: US 11,347,810 B2
(45) Date of Patent: May 31, 2022

(54) METHODS OF AUTOMATICALLY AND SELF-CONSISTENTLY CORRECTING GENOME DATABASES

(71) Applicant: International Business Machines Corporation, Armonk, NY (US)

(72) Inventors: James H. Kaufman, San Jose, CA (US); Matthew A. Davis, San Jose, CA (US); Mark Kunitomi, San Francisco, CA (US); Kenneth L. Clarkson, Madison, NJ (US)

(73) Assignee: International Business Machines Corporation, Armonk, NY (US)

( * ) Notice: Subject to any disclaimer, the term of this patent is extended or adjusted under 35 U.S.C. 154(b) by 832 days.

(21) Appl. No.: 16/226,995

(22) Filed: Dec. 20, 2018

(65) Prior Publication Data

US 2020/0201905 A1      Jun. 25, 2020

(51) Int. Cl.
G06F 16/90       (2019.01)
G06F 16/906     (2019.01)
G06F 16/901     (2019.01)
G06F 16/907     (2019.01)

(52) U.S. Cl.
CPC .......... *G06F 16/906* (2019.01); *G06F 16/907* (2019.01); *G06F 16/9027* (2019.01)

(58) Field of Classification Search
None
See application file for complete search history.

(56) References Cited

U.S. PATENT DOCUMENTS

| | | | |
|---|---|---|---|
| 10,559,386 B1* | 2/2020 | Neumann | G06N 20/10 |
| 2015/0234870 A1* | 8/2015 | Kumar | G06F 16/13 |
| | | | 707/807 |
| 2015/0294065 A1 | 10/2015 | Gautier et al. | |

FOREIGN PATENT DOCUMENTS

WO    2016203246 A1    12/2016

OTHER PUBLICATIONS

Ainsworth et al., "k-SLAM: accurate and ultra-fast taxonomic classification and gene identification for large metagenomic data sets," Nucleic Acids Research, 2017, vol. 45, No. 4, 1649-1656.

(Continued)

*Primary Examiner* — Craig C Dorais
(74) *Attorney, Agent, or Firm* — Michael R. Roberts

(57) ABSTRACT

A method is described for automatically correcting metadata errors in a k-mer database. A k-mer database having a self-consistent taxonomy based on genome-genome distance was constructed from a set of sample and reference genomes whose metadata included taxonomic labeling from a reference taxonomy (the standard NCBI taxonomy), which is not based on genetic distance. As a result, genomes of a given taxonomic ID of the self-consistent taxonomy could be separated into clusters based on the differences in the metadata. Genomes of the clusters less than a minimum cluster size Cmin were removed and profiled against the remaining genomes, correcting metadata automatically for those genomes that could be mapped back. The resulting k-mer database showed improved specificity for genetic profiling. Another method is described for identifying and handling chimeric genomes using the self-consistent taxonomy. Another method is described for correcting a classification database.

24 Claims, 16 Drawing Sheets

(56) References Cited

OTHER PUBLICATIONS

Asnicar et al., "Compact graphical representation of phylogenetic data and metadata with GraPhlAn," PeerJ, 2015, 3:e1029.
Meier-Kolthoff et al., "Genome sequence-based species delimitation with confidence intervals and improved distance functions," BMC bioinformatics 14, 1 (2013).
Mullner, "Modern hierarchical, agglomerative clustering algorithms," arXiv:1109.2378v1 [stat.ML] Sep. 12, 2011.
Ondov et al., "Mash: fast genome and metagenome distance estimation using MinHash," Genome Biology (2016) 17:132.
Ounit et al., "CLARK: fast and accurate classification of metagenomic and genomic sequences using discriminative k-mers," BMC Genomics (2015) 16:236.
Piro et al., "MetaMeta: integrating metagenome analysis tools to improve taxonomic profiling," Microbiome (2017) 5:101.
Wood et al., "Kraken: ultrafast metagenomic sequence classification using exact alignments," Genome Biology, 2014, 15:R46.

* cited by examiner

| self-consistentID | kmer hits | ref_ID1 | prob(1) | ref_ID2 | prob(2) | ref_ID3 | prob(3) | ref_ID4 | prob(4) | ref_ID5 | prob(5) | ref_ID6 | prob(6) |
|---|---|---|---|---|---|---|---|---|---|---|---|---|---|
| 319856 | 250170 | 1350 | 1.0000 | | | | | | | | | | |
| 325910 | 247573 | 590 | 0.0003 | 1301 | 0.9997 | | | | | | | | |
| 327560 | 247153 | 590 | 0.0003 | 1301 | 0.9997 | | | | | | | | |
| 328523 | 224345 | 1279 | 0.0188 | 1350 | 0.9779 | 561 | 0.0006 | 1578 | 0.0006 | 1485 | 0.0006 | 1637 | 0.0013 |

FIG. 6

```
       ┌─────────────┐
       │   SAMPLE    │   FIG. 7A
       └──────┬──────┘
              │ EXTRACT RNA/DNA
              ▼
       ┌─────────────┐
       │    HIGH     │
       │ THROUGHPUT  │   FIG. 7B
       │ SEQUENCING  │
       └──────┬──────┘
              ▼
       ┌─────────────┐
       │ QUALITY CONTROL │   FIG. 7C
       │  (OPTIONAL) │
       └──────┬──────┘
              ▼
       ┌─────────────┐
       │  ASSEMBLE   │
       │   CONTIGS   │   FIG. 7D
       │ (OPTIONAL)  │
       └──────┬──────┘
              ▼
```

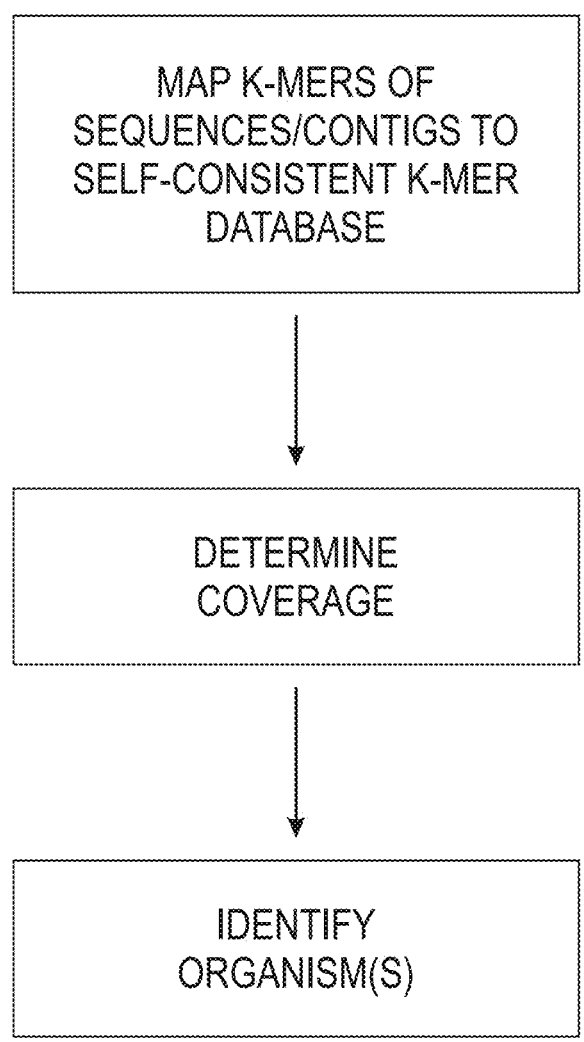

| Tax ID | [cluster sizes] |
|---|---|
| 511678 | [3] |
| 1678 | [330, 2, 1, 1] |
| 1386 | [646, 318, 61, 53, 31, 27, 20, 18, 14, 11, 10, 7, 6, 6, 4, 4, 3, 2, 2, 2, 2, 1, 1, 1, 1, 1, 1] |
| 475 | [94] |
| 194 | [14994, 95, 15, 9, 3, 2, 2, 1] |
| 590 | [39167, 9, 4, 3, 3, 3, 2, 2, 2, 2, 2, 1, 1, 1, 1, 1] |
| 613 | [535, 26, 5, 3, 2, 1, 1, 1, 1] |
| 586 | [20, 6, 6, 2, 1] |
| 2093 | [26, 20, 2, 2, 1, 1] |
| 517 | [190, 11, 1, 1] |
| 698776 | [1] |
| 32008 | [2090, 8, 3, 2, 1, 1] |
| 544 | [52, 48, 24, 18, 17, 15, 14, 10, 9, 9, 6, 6, 5, 5, 4, 2] |
| 662 | [2849, 921, 47, 10, 10, 8, 8, 5, 5, 5, 3, 2, 1, 1, 1, 1, 1, 1, 1, 1] |
| 629 | [397] |
| 1243 | [30, 1] |
| 776 | [18] |
| 773 | [114] |
| 1253 | [21, 5, 4] |
| 482 | [623] |
| 1357 | [44, 11, 5] |
| 445 | [1631, 2, 1] |
| 1743 | [41, 3, 2, 2, 2, 2] |

FIG. 9

| taxid | genus | k-mers per Genus New Database | Ref Seq C | kmers ratio stagefiles | Genomes per Genus New Database | Ref Seq C |
|---|---|---|---|---|---|---|
| 642 | Aeromonas | 194,294,779 | 40,978,682 | 4.74 | 270 | 21 |
| 29330 | Alicyclobacillus | 13,687,418 | 5,668,242 | 2.41 | 7 | 2 |
| 28196 | Arcobacter | 30,498,251 | 10,765,171 | 2.83 | 31 | 6 |
| 1386 | Bacillus | 595,132,007 | 267,699,349 | 2.22 | 1156 | 298 |
| 773 | Bartonella | 50,447,282 | 25,181,200 | 2.00 | 118 | 23 |
| 1678 | Bifidobacterium | 128,222,519 | 46,856,013 | 2.74 | 328 | 69 |
| 517 | Bordetella | 57,896,565 | 51,638,248 | 1.12 | 809 | 314 |
| 1696 | Brevibacterium | 11,091,156 | 7,730,384 | 1.43 | 5 | 1 |
| 234 | Brucella | 12,378,334 | 8,624,156 | 1.44 | 905 | 58 |
| 32008 | Burkholderia | 575,730,718 | 269,933,592 | 2.13 | 3128 | 167 |
| 194 | Campylobacter | 166,684,892 | 42,939,562 | 3.88 | 15111 | 172 |
| 544 | Citrobacter | 86,106,023 | 42,566,416 | 2.02 | 143 | 14 |
| 1870884 | Clostridioides | 35,025,264 | 7,040,597 | 4.97 | 2126 | 7 |
| 1485 | Clostridium | 330,766,867 | 144,448,469 | 2.29 | 387 | 80 |
| 1716 | Corynebacterium | 278,273,971 | 135,699,465 | 2.05 | 434 | 150 |
| 776 | Coxiella | 3,265,347 | 3,140,688 | 1.04 | 20 | 9 |
| 413496 | Cronobacter | 38,202,904 | 26,217,207 | 1.46 | 48 | 12 |
| 547 | Enterobacter | 185,514,164 | 72,391,708 | 2.56 | 1130 | 44 |
| 1350 | Enterococcus | 119,070,801 | 27,815,184 | 4.28 | 1318 | 42 |
| 551 | Erwinia | 27,566,573 | 22,079,416 | 1.25 | 22 | 8 |
| 561 | Escherichia | 142,285,016 | 39,786,341 | 3.58 | 8262 | 311 |
| 724 | Haemophilus | 48,398,229 | 15,170,753 | 3.19 | 344 | 36 |
| 209 | Helicobacter | 82,036,013 | 41,215,698 | 1.99 | 376 | 97 |
| 570 | Klebsiella | 185,909,652 | 64,508,941 | 2.88 | 4682 | 139 |
| 1578 | Lactobacillus | 313,230,999 | 117,462,357 | 2.67 | 707 | 144 |
| 1357 | Lactococcus | 29,826,874 | 15,191,416 | 1.96 | 93 | 32 |
| 445 | Legionella | 181,944,424 | 30,344,997 | 6.00 | 1627 | 67 |
| 1243 | Leuconostoc | 20,713,927 | 15,633,484 | 1.32 | 32 | 17 |
| 1637 | Listeria | 62,562,171 | 22,230,821 | 2.81 | 7260 | 103 |
| 475 | Moraxella | 30,548,486 | 9,897,725 | 3.09 | 100 | 13 |
| 581 | Morganella | 18,131,655 | 3,836,146 | 4.73 | 37 | 2 |
| 1763 | Mycobacterium | 731,627,264 | 186,902,856 | 3.91 | 12506 | 157 |
| 2093 | Mycoplasma | 29,666,825 | 28,808,812 | 1.03 | 178 | 120 |
| 482 | Neisseria | 67,229,464 | 15,580,897 | 4.31 | 636 | 95 |
| 1253 | Pediococcus | 15,406,287 | 9,030,903 | 1.71 | 38 | 13 |
| 1743 | Propionibacterium | 7,455,858 | 5,641,240 | 1.32 | 19 | 4 |
| 583 | Proteus | 32,551,705 | 5,496,349 | 5.92 | 71 | 6 |
| 586 | Providencia | 19,901,068 | 10,066,939 | 1.98 | 13 | 5 |
| 286 | Pseudomonas | 1,684,736,854 | 536,642,427 | 3.14 | 4348 | 221 |
| 590 | Salmonella | 167,015,909 | 33,585,803 | 4.97 | 36243 | 363 |
| 613 | Serratia | 122,549,974 | 65,167,267 | 1.88 | 551 | 27 |
| 620 | Shigella | 8,354,695 | 1,860,806 | 4.44 | 5388 | 20 |
| 1279 | Staphylococcus | 234,559,242 | 61,453,002 | 3.82 | 32159 | 198 |
| 1301 | Streptococcus | 377,636,848 | 95,856,848 | 3.94 | 13138 | 223 |
| 1883 | Streptomyces | 994,593,924 | 435,969,805 | 2.28 | 242 | 74 |
| 662 | Vibrio | 561,858,459 | 143,880,344 | 3.91 | 3815 | 89 |
| 46255 | Weissella | 13,767,373 | 8,285,144 | 1.66 | 22 | 9 |
| 629 | Yersinia | 123,541,028 | 46,818,143 | 2.64 | 384 | 71 |
| | total | 9,247,885,858 | 3,325,717,313 | | 159,306 | 4,052 |
| | | | AVG RATIO | 2.83 | | |

FIG. 13

METHODS OF AUTOMATICALLY AND SELF-CONSISTENTLY CORRECTING GENOME DATABASES

BACKGROUND

The present invention relates to correcting the taxonomic hierarchies of genome databases, and more specifically, to forming self-consistent taxonomies of k-mer databases.

When a patient is ill or a food product is contaminated with infectious organisms, clinicians, public health investigators, and regulators, use a variety of techniques to identify the source of illness or contamination. Next Generation Sequencing (NGS) has become cheap enough that whole genome sequencing (WGS) has been adopted by the Federal Government (FDA, CDC, and USDA). Sequencing instruments have been provided to state public health laboratories for this purpose. Academic groups use a combination of WGS, targeted gene sequencing (e.g., 16S, 18S), sequencing from isolated RNA, and other amplicon sequencing techniques to classify and compare genomes, genes, plasmids, etc., of various organisms. An amplicon is a segment of DNA or RNA that is the source and/or product of amplification or replication events. Sequencing is mandated for outbreaks associated with several pathogenic organisms known to cause foodborne disease. Mandated sequencing is expected to grow over time.

Once a pathogen is sequenced, the data can be used in several ways. For example, the similarity between genomes from several environmental and/or clinical samples has been used to declare that an outbreak is underway. In the past two years, the Centers for Disease Control (CDC) has been able to identify related outbreaks when the sizes of the outbreaks are as small as three patients (the theoretical limit is two patients). The sequence data are also used to identify the strains of organisms as a way of determining the most effective treatment (e.g., choosing the antibiotic most likely to be effective for a specific patient).

The sequence data from food samples, patients, and environmental samples (e.g., factories) are also used to trace an outbreak back to a specific source or responsible entity (e.g., individual, organization). That entity may suffer legal and/or commercial penalties including shut down and/or financial penalties for damages resulting from an outbreak.

If the organism identification is incorrect or inaccurate, patients may not receive the correct medicine, and organizations not involved in an outbreak may be held responsible. Scientific and industrial research groups may also draw invalid conclusions in important work (e.g., drug design, primer design, etc.). For these reasons, it is essential for organism classification and naming to be accurate.

It is also essential that the computer systems and software tools used to perform classifications be fast and efficient. For this reason, many groups are adopting k-mer based classification software.

Classic (standard) taxonomy for bacteria in biology was defined by phenotype (observations under a microscope) absent any information about genotype (genetic data). Now that large amounts of genome data are available, it is apparent that hierarchical clustering based on whole genome distance does not map in a simple 1:1 relationship to the standard taxonomy. Standard taxonomic classification of microbes in official databases (e.g., the National Center for Biotechnology Information (NCBI) Sequence Read Archive (SRA) and NCBI Genbank) contain many errors. Metadata are in error for hundreds of organisms, with genomes receiving the wrong identification (ID). The taxonomic tree is also inaccurate and routinely changes as new genomes are added to NCBI or other public databases. This causes two problems: i) a k-mer database built with the inaccurate and error-filled standard taxonomy loses the ability to accurately identify specific taxa (e.g., genera are not named correctly) and ii) when this sub-optimal database is used to identify newly sequenced organisms, a large fraction of the sequence data from the new organisms may go unidentified or become inaccurately named, resulting in the final identification being simply wrong. An incorrect classification can lead to the wrong name at each level of the taxonomic tree. There are too many errors and too many unusual genotypes to manually curate the hundreds of thousands of genomes available.

Accordingly, a need exists for genomic databases having a self-consistent taxonomy that is insensitive to metadata errors.

SUMMARY

Accordingly, a method is disclosed, comprising:

providing a first database comprising genomes of one or more organisms, the genomes assigned respective taxonomic IDs corresponding to nodes of a self-consistent first taxonomy, IDs meaning identifications, the first taxonomy calculated on the basis of genetic distance, a given taxonomic ID comprising one or more of the genomes, one or more of the genomes containing respective metadata of a reference taxonomy, the reference taxonomy not based on genetic distance, the genomes of at least one taxonomic ID of the first taxonomy separable into one or more clusters based on differences in taxonomic labeling in the metadata;

defining a minimum cluster size Cmin of each taxonomic ID of the first taxonomy wherein Cmin means number of genomes of a cluster, and Cmin is a positive whole number greater than 0;

removing from the first database all genomes of clusters having a cluster size less than Cmin, thereby generating i) a set of remaining genomes and ii) a set of removed genomes;

calculating a self-consistent second taxonomy based on genetic distances of each pair of the remaining genomes;

generating a second database comprising the remaining genomes, the remaining genomes assigned taxonomic IDs corresponding to nodes of the second taxonomy;

classifying each of the removed genomes in the second taxonomy, thereby forming i) a set of mapped genomes assigned to nodes of the second taxonomy and ii) a set of unmapped genomes;

correcting the metadata of the mapped genomes to match the nodes assigned to the mapped genomes of the second taxonomy; and adding one or more of the mapped genomes having new k-mer content to the second database, thereby forming a third database, the third database having greater specificity for taxonomic profiling compared to the first database;

wherein the first database, second database, and third database comprise k-mers of their respective genomes, the first database, the second database, and the third database are stored on a computer readable medium, and the method is capable of being performed automatically and iteratively by a computer system.

Also disclosed is a system comprising one or more computer processor circuits configured and arranged to:

provide a first database comprising genomes of one or more organisms, the genomes assigned respective taxonomic IDs corresponding to nodes of a self-consistent first taxonomy, IDs meaning identifications, the first taxonomy calculated on the basis of genetic distance, a given taxonomic ID comprising one or more of the genomes, one or more of the genomes containing respective metadata of a reference taxonomy, the reference taxonomy not based on genetic distance, the genomes of at least one taxonomic ID of the first taxonomy separable into one or more clusters based on differences in taxonomic labeling in the metadata;

define a minimum cluster size Cmin of each taxonomic ID of the first taxonomy wherein Cmin means number of genomes of a cluster, and Cmin is a positive whole number greater than 0;

remove from the first database all genomes of clusters having a cluster size less than Cmin, thereby generating i) a set of remaining genomes and ii) a set of removed genomes;

calculate a self-consistent second taxonomy based on genetic distances of each pair of the remaining genomes;

generate a second database comprising the remaining genomes, the remaining genomes assigned taxonomic IDs corresponding to nodes of the second taxonomy;

classify each of the removed genomes in the second taxonomy, thereby forming i) a set of mapped genomes assigned to nodes of the second taxonomy and ii) a set of unmapped genomes;

correct the metadata of the mapped genomes to match the nodes assigned to the mapped genomes of the second taxonomy; and add one or more of the mapped genomes having new k-mer content to the second database, thereby forming a third database, the third database having greater specificity for taxonomic profiling compared to the first database; wherein the first database, second database, and third database comprise k-mers of their respective genomes, and the mapped genomes comprise k-mers not present in the second database the first database, the second database, and the third database are stored on a computer readable medium, and the method is capable of being performed automatically and iteratively by a computer system.

Further disclosed is a computer program product, comprising a computer readable hardware storage device having a computer-readable program code stored therein, said program code configured to be executed by a processor of a computer system to implement a method comprising:

providing a first database comprising genomes of one or more organisms, the genomes assigned respective taxonomic IDs corresponding to nodes of a self-consistent first taxonomy, IDs meaning identifications, the first taxonomy calculated on the basis of genetic distance, a given taxonomic ID comprising one or more of the genomes, one or more of the genomes containing respective metadata of a reference taxonomy, the reference taxonomy not based on genetic distance, the genomes of at least one taxonomic ID of the first taxonomy separable into one or more clusters based on differences in taxonomic labeling in the metadata;

defining a minimum cluster size Cmin of each taxonomic ID of the first taxonomy wherein Cmin means number of genomes of a cluster, and Cmin is a positive whole number greater than 0;

removing from the first database all genomes of clusters having a cluster size less than Cmin, thereby generating i) a set of remaining genomes and ii) a set of removed genomes;

calculating a self-consistent second taxonomy based on genetic distances of each pair of the remaining genomes;

generating a second database comprising the remaining genomes, the remaining genomes assigned taxonomic IDs corresponding to nodes of the second taxonomy;

classifying each of the removed genomes in the second taxonomy, thereby forming i) a set of mapped genomes assigned to nodes of the second taxonomy and ii) a set of unmapped genomes;

correcting the metadata of the mapped genomes to match the nodes assigned to the mapped genomes of the second taxonomy; and adding one or more of the mapped genomes having new k-mer content to the second database, thereby forming a third database, the third database having greater specificity for taxonomic profiling compared to the first database; wherein the first database, second database, and third database comprise k-mers of their respective genomes, the first database, the second database, and the third database are stored on a computer readable medium, and the method is capable of being performed automatically and iteratively by a computer system.

Additionally disclosed is a method, comprising:

accessing sequenced nucleic acids of a given sample genome;

selecting a taxonomic target rank from the group consisting of domain, kingdom, division, phylum, class, order, family, genus, species, sub-species, and strain;

forming contigs of the sequenced nucleic acids of the given sample genome;

classifying the contigs using a k-mer based classifier against a self-consistent first taxonomy of a first database, the first taxonomy based on genetic distance, the first database comprising genomes of one or more organisms, wherein each contig is treated as one read;

calculating $N_k$, defined as the sum of new k-mers of the given sample genome not in the first database, wherein $N_k$ has a value greater than or equal to 0;

identifying a primary node of the given sample genome in the first taxonomy, wherein the primary node has more k-mers of the given sample genome at the target rank compared to other nodes at the target rank;

calculating $Y_k$, defined as the sum of k-mers of the given sample genome classified to nodes of the first taxonomy at the target rank other than the primary node; and adding the given sample genome to the first database based on a ratio of $N_k:Y_k$ equaling or exceeding a preselected value greater than or equal to 4:1, thereby forming a second database.

Also disclosed is a computer program product, comprising a computer readable hardware storage device having a computer-readable program code stored therein, said program code configured to be executed by a processor of a computer system to implement a method comprising:

accessing sequenced nucleic acids of a given sample genome;

selecting a taxonomic target rank from the group consisting of domain, kingdom, division, phylum, class, order, family, genus, species, sub-species, and strain;

forming contigs of the sequenced nucleic acids of the given sample genome;

classifying the contigs using a k-mer based classifier against a self-consistent first taxonomy of a first database, the first taxonomy based on genetic distance, the first database comprising genomes of one or more organisms, wherein each contig is treated as one read;

calculating $N_k$, defined as the sum of new k-mers of the given sample genome not in the first database, wherein $N_k$ has a value greater than or equal to 0;

identifying a primary node of the given sample genome in the first taxonomy, wherein the primary node has more k-mers of the given sample genome at the target rank compared to other nodes at the target rank;

calculating $Y_k$, defined as the sum of k-mers of the given sample genome classified to nodes of the first taxonomy at the target rank other than the primary node; and adding the given sample genome to the first database based on a ratio of $N_k:Y_k$ equaling or exceeding a preselected value greater than or equal to 4:1, thereby forming a second database.

Further disclosed is a system a system comprising one or more computer processor circuits configured and arranged to:

access sequenced nucleic acids of a given sample genome;

select a taxonomic target rank from the group consisting of domain, kingdom, division, phylum, class, order, family, genus, species, sub-species, and strain;

form contigs of the sequenced nucleic acids of the given sample genome;

classify the contigs using a k-mer based classifier against a self-consistent first taxonomy of a first database, the first taxonomy based on genetic distance, the first database comprising genomes of one or more organisms, wherein each contig is treated as one read;

calculate $N_k$, defined as the sum of new k-mers of the given sample genome not in the first database, wherein $N_k$ has a value greater than or equal to 0;

identify a primary node of the given sample genome in the first taxonomy, wherein the primary node has more k-mers of the given sample genome at the target rank compared to other nodes at the target rank;

calculate $Y_k$, defined as the sum of k-mers of the given sample genome classified to nodes of the first taxonomy at the target rank other than the primary node; and add the given sample genome to the first database for $N_k:Y_k$ greater than or equal to 4:1, thereby forming a second database.

Also disclosed is a method, comprising:

accessing a classification database comprising a set of classified genomes, the classification database having a taxonomy, the taxonomy having a binary tree structure comprising nodes, the set of genomes classified to respective nodes;

selecting an upper limit of the number of genomes of the set that can be processed for any given k-mer of the set, designated T, wherein T is a positive whole number greater than or equal to 1;

updating a look-up table in a computer process, the look-up table containing i) the k-mers of the set, ii) respective lowest common ancestor nodes of the k-mers, and iii) respective number of processed genomes of the set containing the k-mers, the respective number of processed genomes of the set initially being zero, the process comprising:
 a) selecting randomly a given genome G of the set,
 b) selecting a given k-mer M of given genome G, wherein M is a unique identifier, the given k-mer M has a lowest common ancestor $L_M$, the given k-mer M has a number of processed genomes $N_M$ of the set containing the given k-mer M, and $N_M$ has a value greater than or equal to 0 and less than or equal to T,
 c) determining the lowest common ancestor of given genome G and $L_M$, designated $L'_M$,
 d) setting $L_M$ of the given k-mer M to $L'_M$ and increasing $N_M$ by 1 for $N_M$ of the given k-mer M less than T,
 e) repeating steps b) to d) for each remaining k-mer of the given genome G, and
 f) repeating steps a) to e) for each remaining genome of the set, thereby forming an updated look-up table; and
updating the classification database with $L_M$ and $N_M$ of each of the k-mers of the set from the updated look-up table, thereby forming a corrected classification database.

Further disclosed is a computer program product, comprising a computer readable hardware storage device having a computer-readable program code stored therein, said program code configured to be executed by a processor of a computer system to implement a method comprising:

accessing a classification database comprising a set of classified genomes, the classification database having a taxonomy, the taxonomy having a binary tree structure comprising nodes, the set of genomes classified to respective nodes;

selecting an upper limit of the number of genomes of the set that can be processed for any given k-mer of the set, designated T, wherein T is a positive whole number greater than or equal to 1;

updating a look-up table in a computer process, the look-up table containing i) the k-mers of the set, ii) respective lowest common ancestor nodes of the k-mers, and iii) respective number of processed genomes of the set containing the k-mers, the respective number of processed genomes of the set initially being zero, the process comprising:
 a) selecting randomly a given genome G of the set,
 b) selecting a given k-mer M of given genome G, wherein M is a unique identifier, the given k-mer M has a lowest common ancestor $L_M$, the given k-mer M has a number of processed genomes $N_M$ of the set containing the given k-mer M, and $N_M$ has a value greater than or equal to 0 and less than or equal to T,
 c) determining the lowest common ancestor of given genome G and $L_M$, designated $L'_M$,
 d) setting $L_M$ of the given k-mer M to $L'_M$ and increasing $N_M$ by 1 for $N_M$ of the given k-mer M less than T,
 e) repeating steps b) to d) for each remaining k-mer of the given genome G, and
 f) repeating steps a) to e) for each remaining genome of the set, thereby forming an updated look-up table; and
updating the classification database with $L_M$ and $N_M$ of each of the k-mers of the set from the updated look-up table, thereby forming a corrected classification database.

Additionally disclosed is a system comprising one or more computer processor circuits configured and arranged to:

access a classification database comprising a set of classified genomes, the classification database having a taxonomy, the taxonomy having a binary tree structure comprising nodes, the set of genomes classified to respective nodes;

select an upper limit of the number of genomes of the set that can be processed for any given k-mer of the set, designated T, wherein T is a positive whole number greater than or equal to 1;

update a look-up table in a computer process, the look-up table containing i) the k-mers of the set, ii) respective lowest common ancestor nodes of the k-mers, and iii) respective number of processed genomes of the set containing the k-mers, the respective number of processed genomes of the set initially being zero, the process comprising:
 a) selecting randomly a given genome G of the set,
 b) selecting a given k-mer M of given genome G, wherein M is a unique identifier, the given k-mer M has a lowest common ancestor $L_M$, the given k-mer M has a number of processed genomes $N_M$ of the set containing the given k-mer M, and $N_M$ has a value greater than or equal to 0 and less than or equal to T, c) determining the lowest common ancestor of given genome G and $L_M$, designated $L'_M$, d) setting $L_M$ of the given k-mer M to $L'_M$ and increasing $N_M$ by 1 for $N_M$ of the given k-mer M less than T, e) repeating steps b) to d) for each remaining k-mer of the given genome G, and f) repeating steps a) to e) for each remaining genome of the set, thereby forming an updated look-up table; and update the classification database with $L_M$ and $N_M$ of each of the k-mers of the set from the updated look-up table, thereby forming a corrected classification database.

The above-described and other features and advantages of the present invention will be appreciated and understood by those skilled in the art from the following detailed description, drawings, and appended claims.

BRIEF DESCRIPTION OF THE SEVERAL VIEWS OF THE DRAWINGS

FIG. 6 is a sample of tabulated probabilistic report data available after k-mer analysis of sample data using the self-consistent k-mer database.

FIGS. 7A-7G are portions of a flow diagram for a process of profiling nucleic acids of a sample using the self-consistent k-mer database.

In FIG. 8A, a large block of *Salmonella* genomes are shown incorrectly broken up. FIG. 8B shows the same genomes merged after some errors are corrected.

FIG. 9 is a partial report showing the actual clusters obtained for a sample set of genus-ranked taxonomic IDs (self-consistent IDs) of a self-consistent k-mer database containing approximately 164,714 sample genomes.

FIG. 13 is a partial report showing the increase in database k-mers by genus (in comparison to Ref-Seq Complete) using the disclosed method of handling chimeric genomes.

DETAILED DESCRIPTION

Figure 1:
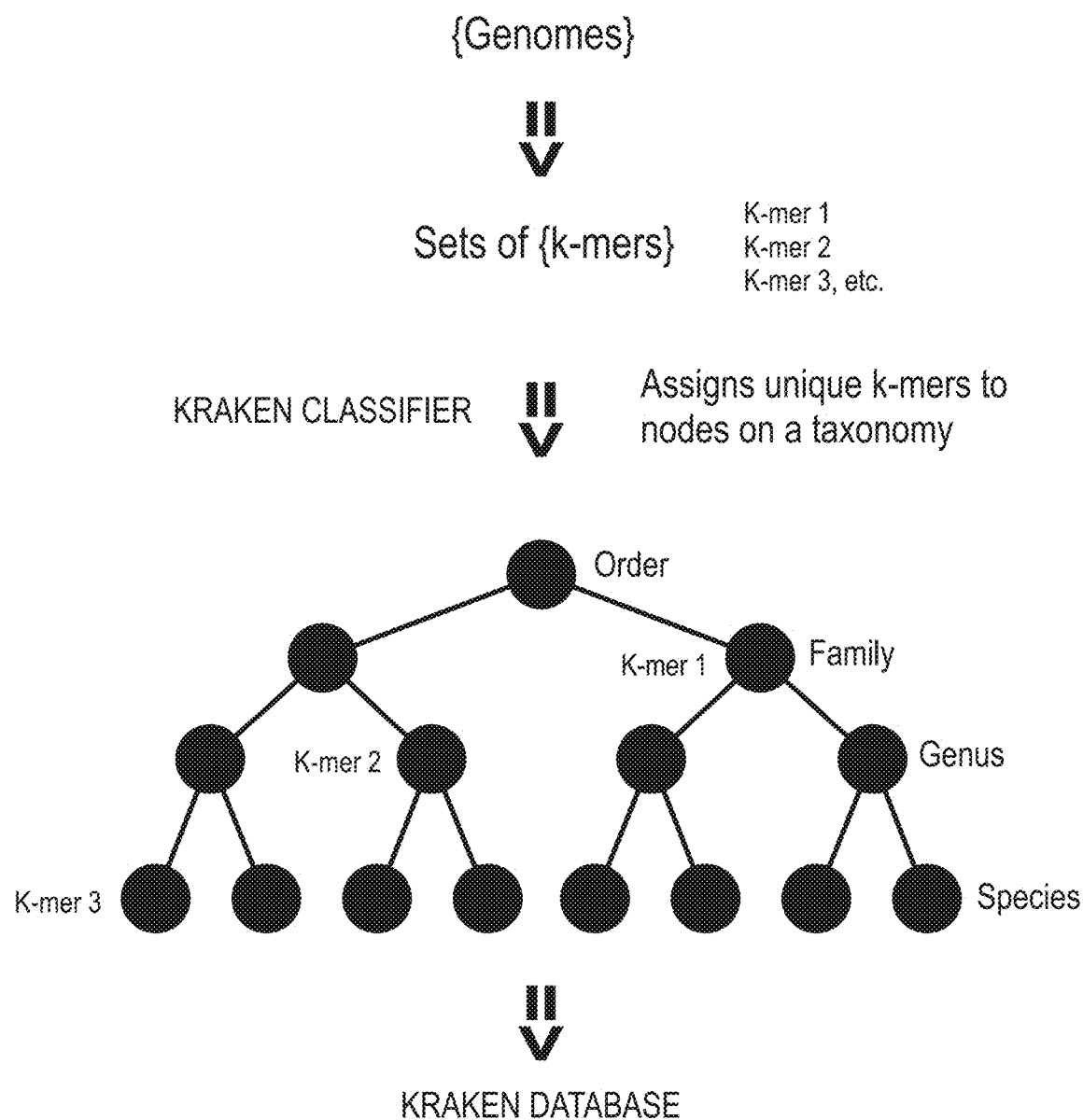
FIG. 1 is a diagram showing an existing process of classifying sequence reads using a Kraken classifier.

Methods are disclosed for automatically and self-consistently correcting taxonomic classifications of a k-mer database. Also disclosed are methods of consistently classifying k-mers of chimeric genomes. Herein, a k-mer database is an electronic file comprising k-mers of sequenced DNA and/or RNA of one or more organisms. The organisms can be eukaryotic or prokaryotic, preferably prokaryotic microorganisms. K-mers are sub-sequences of nucleotide sequences having a length k in nucleotide residues, where k is a positive whole number greater than 1, preferably a positive whole number in the range of about 10 to about 1000. The k-mer database has a self-consistent taxonomy calculated on the basis of genetic distances, with the k-mers mapped to the lowest common ancestor (LCA).

Definitions

The following definitions are applicable.

Abbreviations A, C, G, and T refer to nucleotide bases adenine, cytosine, guanine, and thymine, respectively.

A "clade" is a group of biological taxa (such as species) that includes all descendants of one common ancestor.

A "contig" is a set of overlapping DNA sequences that together represent a consensus sequence of DNA or a region thereof.

A "consensus sequence" is the calculated order of the most frequent residues found at each position in a sequence alignment.

"Copy number" means the number of copies of a gene or plasmid within a genome. The copy number can vary from individual to individual.

"Coverage" or "depth of coverage" is the number of times a given sequence from a genome is represented in the set of sequences derived from that genome.

"DNA" is deoxyribonucleic acid.

A "protein domain" is a region of a protein having a particular shape and/or function.

A "gene" is the basic unit of heredity, a linear sequence of nucleotides along a segment of DNA that provides the coded instructions for synthesis of RNA, which, when translated into protein, leads to the expression of a hereditary trait.

"Genetic distance" is a quantitative measure of the divergence of one or more regions of DNA and/or RNA between species. Genetic distance can be based on whole genome-whole genome distances, gene-gene distances, protein domain-protein domain distances (i.e., the portions of the DNA encoding for a particular protein domain), protein-protein distances (i.e., the portions of the DNA encoding for a whole protein), or protein domain-protein domain distances based on an amino acid distance metric. More specifically, genetic distance is a measure of the differences in nucleotide sequences of the k-mers with respect to whole genomes, genes, and/or other genetic regions of interest. Thus, the average number of codon or nucleotide differences per gene can be a measure of genetic distance. For the present work, the genetic distance is a numeric distance calculated between each pair of genomes of the reference database using MASH (which utilizes the MinHash algorithm). The MinHash algorithm calculates distance from a Jaccard index. The Jaccard index is calculated from "sketches" of the k-mers, which are diagrams showing the similarity and differences between k-mers of the pair of genomes.

A "genome" is the total genetic content of a microorganism. In the case of bacteria, the genome is DNA.

A "ground truth dataset" is a dataset formed by direct observation (measured data) as opposed to data obtained by inference or assumption.

Herein "high-throughput sequencing" (HTS) is any method of sequencing a nucleic acid that is highly parallel and does not involve cloning the nucleic acid. A genome or metagenome is cut into a large number of fragments, and the fragments are sequenced in parallel.

"Homology" refers to the similarity of sequences (e.g., DNA, RNA, Protein, etc.) arising from a common ancestry.

"Hybridization" is the formation of double-stranded helix from single-stranded complimentary pairs of DNA and/or RNA by annealing.

The term "k-mer" means a sub-sequence of a read obtained through DNA sequencing having k number of nucleotide base units, where k is a positive whole number greater than 1.

Herein, a "database" is an electronic file for storing and retrieving data. Databases are also referred to herein as data tables. Data tables comprise rows and columns (i.e., fields) of data. The rows are formally called tuples or records. A data table comprises one or more records, each record comprising one or more defined fields having respective defined data types (e.g., text, numeric, date, time, memo, and so on) and defined field lengths where applicable. A working data table comprises at least one record containing data in one or more fields of the record. The data tables are located on data storage devices, which can be remote or local relative to the user input/output devices. A "database system" comprises at least one data table and a database management software program for managing the storage and retrieval of data to and from the data tables. The database management programs can be remote or local relative to the data tables and/or the end user. A Relational Database Management System (RDBMS) is a database management system (DBMS) that uses relational techniques for storing and retrieving data using data tables. A relational database system can have many data tables, and each data table can have multiple records and multiple fields within each record.

A data table in a relational database system can be accessed using an index. An index is an ordered set of references (e.g., pointers) to the records or rows in a data table. The index is used to access each record in the file using a key (e.g., one or more of the fields of the record or attributes of the row). Without an index, finding information in a large data table would require a resource-intensive time-consuming scan (e.g., linearly) of each record of a table. Indexes provide a faster alternate technique of accessing data contained in one or more data tables that are linked by a common key. Users can create indexes on a table after the table is built. An index is based on one or more columns (fields) of a given table.

A "k-mer database" is a database in which a given record comprises a field for storing a k-mer of a nucleic acid sequence of an organism. The record can contain a field for storing an accession ID of the k-mer and an accession ID of a genome containing the k-mer, thereby linking the k-mer to the genome. Another field of the record can store a taxonomic ID that associates the k-mer to a lowest common ancestor node (LCA) of a first taxonomy. As will be described below in more detail, another field of the record can store a taxonomic reference ID of a reference taxonomy, thereby linking the k-mer to a node of the reference taxonomy. Still other fields of the record can store metadata associated with, for example, the k-mer, the nucleic acid sequence from which the k-mer originated, the sample ID, the location and date of the sample, and so on. Thus, a genome, which is a collection of k-mers, is linked to (contains) all of the metadata of the k-mers having the accession ID of the genome.

Kraken is a taxonomic classifier that assigns taxonomic labels to DNA sequences, including k-mers. Kraken uses k-mers from a sequence read to query a reference database containing k-mers from reference genomes (i.e., the genomes of RefSeq Complete at NCBI) for matches. The k-mers are mapped to the lowest common ancestor (LCA) of all genomes known to contain a given k-mer. Typically, the k value for a k-mer query is 31 but this value can be modified by the user. For typical queries, k can be a positive whole number in the range of about 10 to about 1000.

Herein, a "Kraken database" is a database containing k-mers assigned to a taxonomic hierarchy by the Kraken classifier.

A "locus" (plural loci) is a position on a genome (e.g., gene, regulatory element, origin of replication).

A "metagenome" is all the genetic information of a sample.

"Metagenomics" is the analysis or study of metagenomes.

"Metatranscriptome" is the collection of all RNA transcripts of a sample.

"Metatranscriptomics" is the analysis or study of metatranscriptomes.

A "microbiome" is a community of microorganisms that inhabit a particular environment (e.g., microbes of the human gut), or a sample taken therefrom.

"Origin of replication" is the locus at which DNA replication begins.

Operational taxonomic units (OTUs) are used by taxonomy classifier systems (e.g., Kraken classifier) to categorize the k-mers based on sequence similarity. For example, in 16S rRNA metagenomics, OTUs are clusters of similar sequence variants of the bacterial 16S rRNA marker gene sequence. Each cluster represents a taxonomic unit of a bacterial species or genus depending on the sequence similarity threshold. Typically, OTU clusters are defined by a 97% identity threshold of the 16S gene sequences to distinguish bacteria at the genus level. Species separation requires a higher threshold of 98% or 99% sequence identity, or the use of exact sequence variants instead of OTU cluster.

A "plasmid" is a self-replicating extrachromosomal circular DNA that replicates independently of the bacterial chromosome and carries genes for functions not essential for growth.

"mRNA" refers to messenger RNA. The mRNA codes for amino acid sequences composing proteins.

"rRNA" refers to ribosomal RNA.

"tRNA" refers to transfer RNA. A tRNA transports a specific amino acid to a ribosome for synthesis of a protein.

An "RNA transcript" is an RNA produced through the process of transcription of DNA.

"Sample" means any sample containing DNA and/or RNA capable of undergoing analysis using the disclosed methods.

"Sequencing" refers to a process of determining the precise order of base residues (i.e., nucleotides) in a nucleic acid (e.g., DNA, RNA).

A "sequence" is a fragment of a nucleic acid (e.g., RNA, DNA) that has been sequenced (i.e., the order of the nucleotides bases is known).

A "sequence read" or "read" is a finite length or fragment of a nucleic acid that is output by a sequencing instrument. For example, a read from an Illumina sequencer is 100-150 base pairs in length today. Sequencing may also be done on "paired end" reads where two reads are connected by a spacer (that is not read), increasing the effective read length to 300 or more and covering a larger region of the genome.

"RNA" is ribonucleic acid.

A "sequence alignment" is a way of arranging sequences to identify regions of similarity, which may be a consequence of functional, structural, or evolutionary relationships between the sequences.

"Shotgun sequencing" is a quasi-random process in which a nucleic acid is broken up into many random smaller fragments that are individually sequenced. The sequences are ordered based on overlapping regions of genetic code, and reassembled into the complete sequence of the nucleic acid.

"Taxonomy" is a biological scheme of classification of organisms. Herein, for bacteria, the heirarchy is domain, kingdom, division, phylum, class, order, family, genus, species, sub-species, and strain. Each of the foregoing classifications is a "rank" on the taxonomic tree.

A "taxonomic tree" herein is a data structure for classifying organisms. The taxonomic tree comprises nodes (i.e., taxa, singular taxon) that are grouped into "parent nodes" linked to "child nodes". Parent nodes are depicted above child nodes in the tree diagram. Child nodes are taxonomic descendants of parent nodes. For example, a genus (parent node) can be linked to two or more species (child nodes). The taxonomic tree can be rooted (i.e., known ancestral root) or unrooted (i.e., unknown ancestral root), bifurcating (i.e., two child nodes per parent node) or multi-furcating (i.e., more than two child nodes per parent node). Typically, the taxonomic tree is in the form of a "binary tree" (i.e., each parent node has two child nodes). A "leaf node" is a child node having no descendants (e.g., the species of a genus). In the self-consistent taxonomy, each leaf node has one genome. "Internal nodes" are all nodes other than the leaf nodes.

"Transcription" is the process of forming an RNA from a DNA template.

The abbreviation "bp" means "base-pair" (e.g., a read of 100-bp means that one DNA read has 100 nucleotides in the polymer chain).

"Miscalling" refers to a sequencing error where a nucleotide in a sequencing read is different from the true nucleotide.

A quality value is an assigned value given to each nucleotide in a sequencing read that reflects the likelihood of miscalling the nucleotide. The higher the quality value is, the lower the likelihood of miscalling.

A "reference genome" is a genome from the same species or close species that has already been sequenced.

"Mapping" a sequencing read is a process of finding the position or coordinate of a sequencing read on the reference genome.

A "perfect match prefix" is a k-mer of a sequencing read that is identical to, or a perfect match to some equal-length k-mer(s) of the reference genome. The k-mer of the sequencing read is used to initially anchor the sequencing read on the reference genome.

Base substitution: After a sequencing read is mapped to the reference genome, certain bases are different from the corresponding bases on the reference genome.

Insertion: Compared with the reference genome, some continuous bases are inserted between two adjacent bases on the sequencing read.

Deletion: Compared with the reference genome, the sequencing read loses some continuous bases.

INDEL: an insertion or deletion in a read when trying to find the best alignment of a read to a reference genome.

FIG. 1 is a diagram showing an existing process of classifying sequence reads using a Kraken classifier. In a k-mer based classification method, a reference database (e.g., RefSeq complete) is provided having a set of genomes and taxonomy (e.g., standard NCBI taxonomy) provided by the user. A sample metagenome is sequenced, producing reads of varying base length. The classifier program (e.g., Kraken classifier, CLARK classifier) scans each k-mer of a given read and consults the reference database, which can contain many genomes, for an exact match. As there are often multiple exact k-mer matches for a given read, the classifier must also resolve conflicts against the taxonomy. When a consensus decision is reached by the software program, taking into account configurable threshold options (e.g., the number of k-mers that must match), the k-mer is declared as either classified and given a taxonomic ID or remains unclassified. A consensus is defined by the majority (largest fraction) of k-mers matching a single or unique lineage. The classified k-mers are assigned to nodes on a taxonomic tree.

Herein, a "reference taxonomy" is defined as a not-self-consistent taxonomy. A not-self-consistent taxonomy is one in which classifications can be made based on conflicting, incomplete, and/or erroneous input, that cause k-mers to be misclassified. Conflicting inputs can include errors in metadata. Metadata are any supplemental information added to the records of a database (e.g., information about the taxonomic hierarchy, the k-mers, and/or the reads, and so on). The metadata can be introduced by either the programs operating on the reads, human operators of the programs, or both. The metadata can be used to compare a classification done by the classifier program (e.g., Kraken) with a classification assigned by some other method (e.g., the lab contributing the other metadata) for validation purposes and/or identifying inconsistencies and errors.

RefSeq is the NCBI database of reference sequences. RefSeq is a curated, non-redundant set including genomic DNA contigs, mRNAs and proteins for known genes, and entire chromosomes. The RefSeq database is referred to herein as the "reference database" having a reference taxonomy that is not a self-consistent taxonomy. The sequences of the reference database have reference identifications (abbreviated as reference IDs) that represent nodes of the reference taxonomy. It is known that at least one genome of the reference database has been misclassified (i.e., the genome was incorrectly assigned a reference ID associating the genome with the wrong node). Misclassifications of genomes in the reference taxonomy can occur due to many factors, including metadata errors entered manually and even errors in the NCBI taxonomy. Occasionally, NCBI finds errors and revises the NCBI taxonomy.

Figure 2:
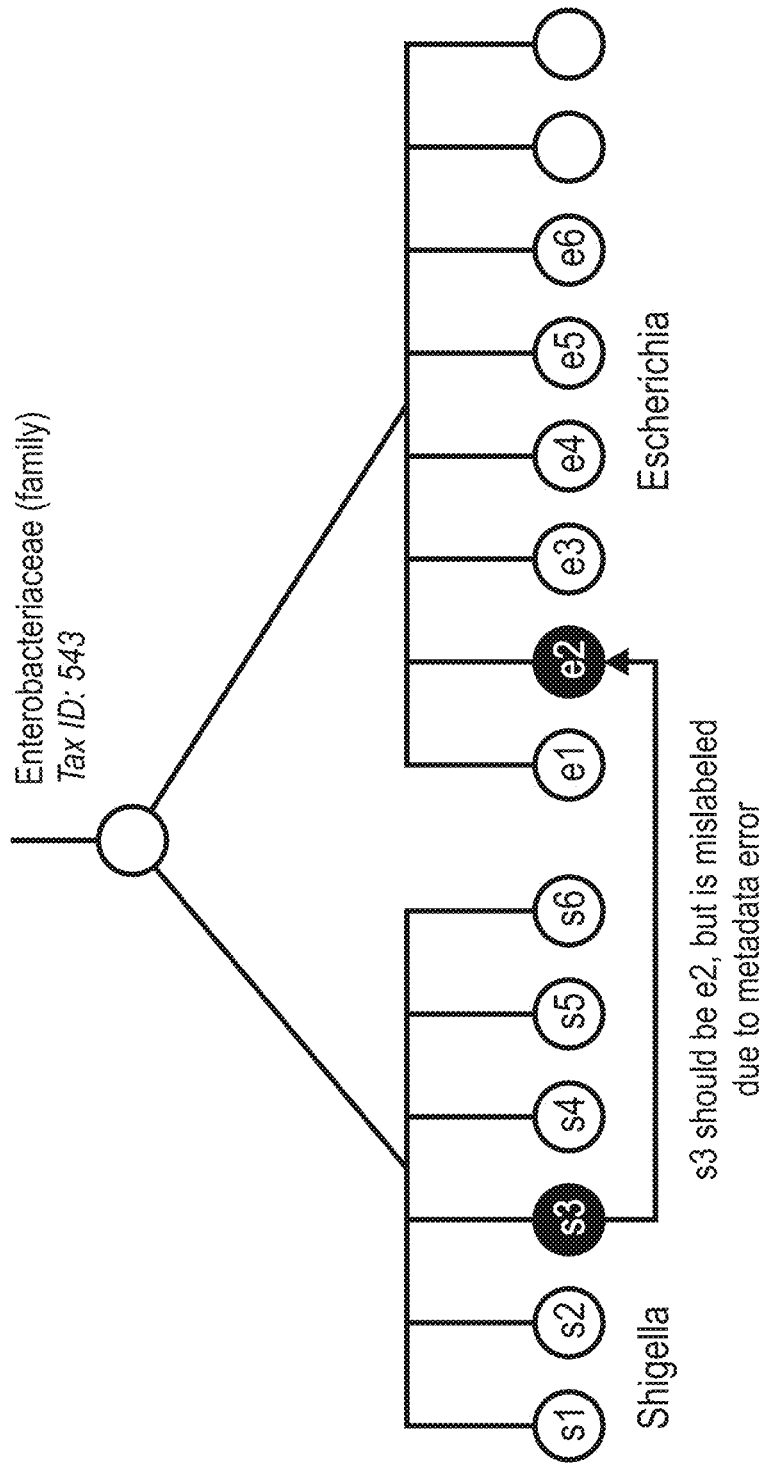
FIG. 2 is a diagram showing a portion of a reference taxonomy (a not-self-consistent taxonomy) of a reference k-mer database containing metadata errors (e.g., from NCBI). In this example, the genome indicated as 's3' is incorrectly labeled as a *Shigella* genome and, based on that invalid metadata, placed with other *Shigella* genomes in the tree (indicated by the first character 's'). In fact, this hypothetical genome 's3' is an *Escherichia* genome.

FIG. 2 is a diagram showing a portion of a reference taxonomy (a not-self-consistent taxonomy) of a reference k-mer database containing metadata errors (e.g., from NCBI). Metadata errors combined with a not-self-consistent taxonomy degrade the ability of a database system to assign a specific organism identification. Genomes at the leaf nodes of the reference taxonomy can be placed there based on manually added taxonomic IDs, which may be incorrect. In this example, the genome indicated as 's3' is incorrectly labeled as a *Shigella* genome and, based on that invalid metadata, placed with other *Shigella* genomes in the tree (indicated by the first character 's'). In fact, this hypothetical genome 's3' is an *Escherichia* genome. It "should be" labeled as *Escherichia* (e.g., 'e2') and placed on the tree with other *Escherichia* species, but it is not. Accordingly, node 'e2' is missing. The mislabeled *Escherichia* genome shares a large number of k-mers with all other *Escherichia* genomes, and when the database is built, k-mers that are shared by nodes at the same level or below on the tree are moved up to the lowest common ancestor (LCA) node (e.g., k-mers common to two or more species nodes move up to a common genus node). The node from which the k-mers move up retains only k-mers unique to that node. In this example, many of the k-mers that should be used to identify the genus *Escherichia* (and distinguish it from the genus *Shigella*) will move up to the *Enterobacteriaceae* family node in the tree, the LCA of the *Shigella* and *Escherichia* genera. This error greatly diminishes the ability of the reference database to identify the two organisms and increases the error in the identification capacity, rendering the information useless, for example, in disease diagnostics.

On the other hand, if the genomes are mapped to a self-consistent taxonomy, the problem with inaccurate or incorrect metadata can be separated from the k-mer classifications and construction of the k-mer database, thereby establishing an accurate classification for each k-mer. A self-consistent taxonomy is defined as a taxonomy constructed, preferably exclusively, from the calculated genetic distances. Herein, "genetic distance" is a measure of the taxonomic divergence between species or between populations within a species. Genetic distance can be based on actual domain-domain distances, genome-genome distances, gene-gene distances, protein-domain-protein domain, and/or protein-protein distances. In a practical sense, it is a measure of the differences in nucleotide sequences of the k-mers with respect to whole genomes, genes, and/or other genetic regions of interest (e.g., a region of a gene, a region surrounding a locus initiating replication of a bacterium, a region coding for a particular protein). Populations with many similar alleles have small genetic distances. This indicates that they are closely related and have a recent common ancestor.

A flow diagram for a method of constructing a k-mer database having a self-consistent taxonomy from any collection of genomes is shown in FIGS. 3A-3G.

Figure 3:
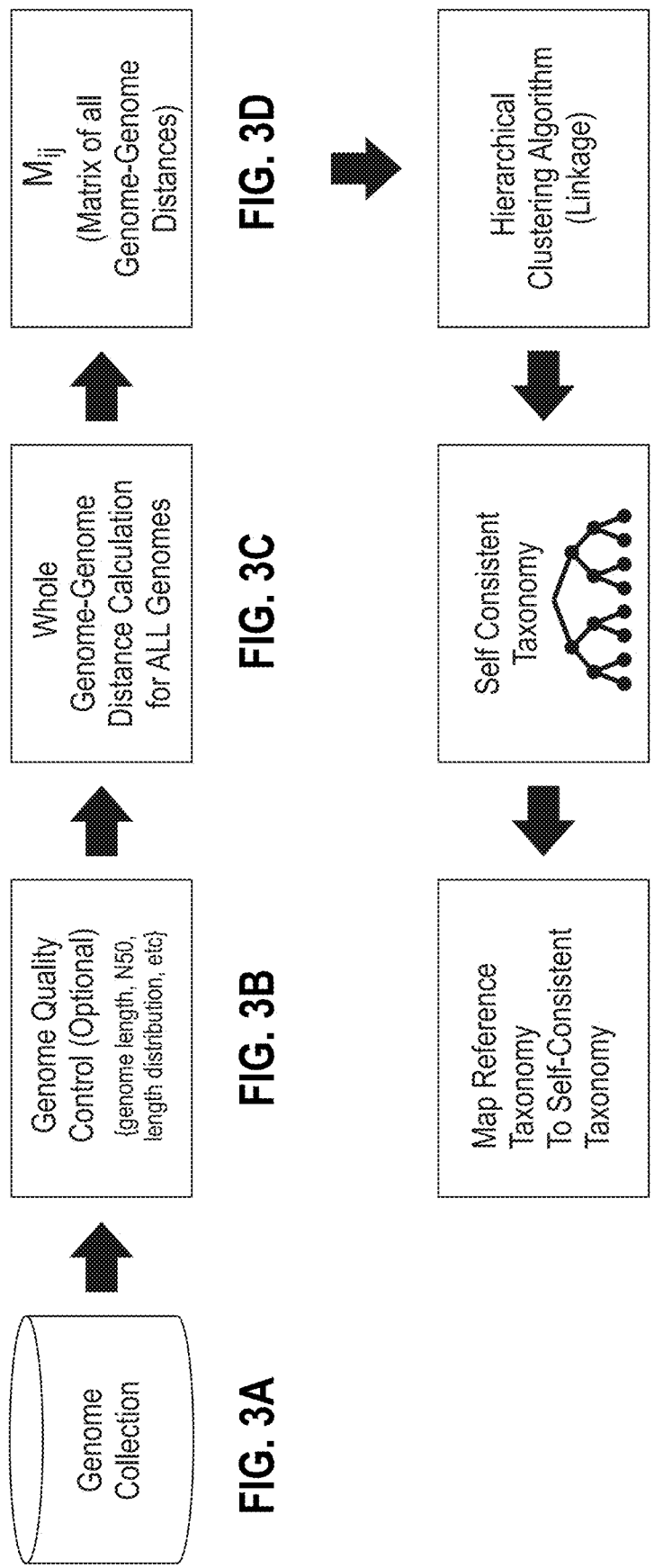
FIGS. 3A-3G are portions of a flow diagram for a method of constructing a k-mer database having a self-consistent taxonomy from any collection of genomes.

The method begins by initially providing a collection of sequenced whole genomes (FIG. 3A). For the present work, the raw sequences of 360,000 prokaryote genomes were downloaded in December, 2016 from the SRA at the NCBI website, and these were assembled into genomes. Almost half of the genomes had either metadata errors, misclassified reads, and/or were of poor quality due to other reasons. This collection of assembled genomes served as a "sample" containing unclassified k-mers of nucleic acid for the following steps.

Optionally, quality control can be performed on the reads of the sample (FIG. 3B). Quality control can include, for example, the removal (trimming) of low-quality reads or segments of reads. Non-limiting trimming algorithms and software programs for cleanup of raw DNA sequence reads include SolexaQA DynamicTrim, FASTX-ToolKit, ConDeTri, NGS QC Toolkit, FASTQC, and Trimmamatic. For the present work, FASTQC and Trimmamatic were used on the genomes of the sample. The result was a "clean sample" containing 170,000 assembled genomes.

Next, the genetic distances were calculated for every pair of genomes of the clean sample (FIG. 3C). The result is a two-dimensional matrix M comprising genetic distances $m_{i,j}$ (FIG. 3D), where each element $m_{ij}$ is a calculated distance between genome i and genome j of the clean sample. Subscripts i and j are index values to each genome of the pair used to calculate distance $m_{ij}$. The distance between every genome and every other genome of the cleaned sample was calculated, resulting in matrix M. Non-limiting methods of calculating genetic distances include the MinHash method, the Meier-Kolthoff method, Cavalli-Sforza chord distance method, the Reynolds, Weir, and Cockerham method, Nei's standard genetic distance method, and pairwise distance method. Pairwise distance methods calculate distances based on differences between all pairs of k-mers in two datasets. For the present work, the genetic distances were calculated using the program MASH (github.com/marbl/Mash) using the MinHash algorithm (ONDOV, et al., "Mash: fast genome and metagenome distance estimation using MinHash," Genome Biology (2016), 17:132). MinHash calculates the distances between all pairs of genomes in the cleaned sample from k-mer "sketches." A sketch is a compressed representation of sequences that allows for tracking k-mer counts and k-mer frequency distributions of a sequence data set without storing the sequence structures themselves, thereby saving computer storage space and memory usage. The sketches are evaluated to produce a Jaccard index, which is used to calculate genetic distances between, in the present instance, pairs of genomes. The calculated distance matrix M for 170,000 genomes was over 5 gigabytes in size. The disclosed method is not limited to the use of MinHash for calculating the Jaccard index.

Classifying k-Mers to a Self-Consistent Taxonomy

The matrix M serves as input to a hierarchical agglomerative (bottom-up) or divisive (top-down) clustering algorithm (FIG. 3E) to compute a self-consistent taxonomy. For the present work, the clustering algorithm used was agglomerative single linkage (SLINK) using minimum spanning tree (MST) described respectively by Sibson, R., "SLINK: an optimally efficient algorithm for the single link cluster method," The Computer Journal, 1973, 16:30-34, and Rohlf, F. James, "Algorithm 76. Hierarchical clustering using the minimum spanning tree," The Computer Journal, 1973, 16:93-95. The clustering algorithm computes a new self-consistent taxonomy, which is independent of the reference taxonomy (i.e., the NCBI taxonomy) because it is based exclusively on the calculated genetic distance between the genomes of the clean sample (FIG. 3F). The self-consistent taxonomy is a binary tree. Each node of the self-consistent taxonomy is assigned a unique self-consistent ID. Each k-mer of the clean sample is assigned to one and only one node of the self-consistent taxonomy, the lowest common ancestor (LCA) node of the k-mer.

Other non-limiting agglomerative clustering algorithms include i) complete linkage (CLINK), ii) unweighted pair-group method using arithmetic averages (UPGMA, also called unweighted arithmetic average clustering), iii) weighted arithmetic average clustering (WPGMA, also referred to as "Mcquitty"), iv) Ward method, v) unweighted centroid clustering (UPGMC), and vi) weighted centroid clustering (WPGMC).

A non-limiting example of a divisive clustering algorithm is DIANA (Divisive Analysis Clustering).

In an embodiment, the self-consistent taxonomy is based on genome-genome distances calculated by MinHash. In another embodiment, the self-consistent taxonomy is based on genome-genome distances calculated by the Meier-Koltoff method. In another embodiment, the self-consistent taxonomy is based on genome-genome distances calculated by the Levenshtein distance method (also referred to as "edit distance" based on the number of edits required to convert one string (read) into another). In another embodiment, the self-consistent taxonomy is based on gene-gene distances in which sequence alignments to a known reference genome are performed by a software program MUSCLE (MUltiple Sequence Comparison by Log-Expectation), and genetic distance is calculated using Nei's standard genetic distance method or pairwise distance method.

MUSCLE is a multiple sequence alignment (MSA) software tool. MSA is generally the alignment of three or more biological sequences (protein or nucleic acid) of similar length. Other MSA software tools include Clustal Omega, Kalign, MAFFT, MView, MAFFT_addseq, T-Coffee, and WebPRANK.

Pairwise sequence alignment (PSA) is used to identify regions of similarity between two sequences. Pairwise sequence alignment tools include Needle and Stretcher for global (end-to end) alignment; Water, Matcher, and LALIGN for local alignment; and Genewise for genomic alignment. Other pairwise sequence alignment tools include and Promoterwise and Wise2dba.

Constructing a Self-Consistent k-Mer Database and Circumventing Metadata Errors

The self-consistent taxonomy is then used to construct a k-mer database (also referred to herein as a "self-consistent k-mer database) containing the k-mers of the clean sample associated with respective self-consistent IDs.

Mapping the Reference Taxonomy to the Self-Consistent Taxonomy

Next, a map is created associating the self-consistent IDs of the self-consistent taxonomy to the reference IDs of the reference taxonomy (FIG. 3G). In effect, this amounts to re-classifying the smaller number of genomes (k-mers) of the reference database (e.g., RefSeq Complete) against the new self-consistent taxonomy while carrying forward the reference IDs and metadata of the reference taxonomy (i.e., the RefSeq Complete taxonomy) into the self-consistent k-mer database. This process was accomplished using a custom software program. Every k-mer of the smaller reference database was assigned a node in the self-consistent taxonomy, thereby linking nodes of the new self-consistent taxonomy to named organisms of the reference taxonomy. Underlying child nodes of the self-consistent taxonomy that contained k-mers (i.e., of the 170,000 genomes) not present in the reference database (i.e., RefSeq Complete) were also linked to organisms of the reference taxonomy through interior nodes of the self-consistent tree.

Figure 4:
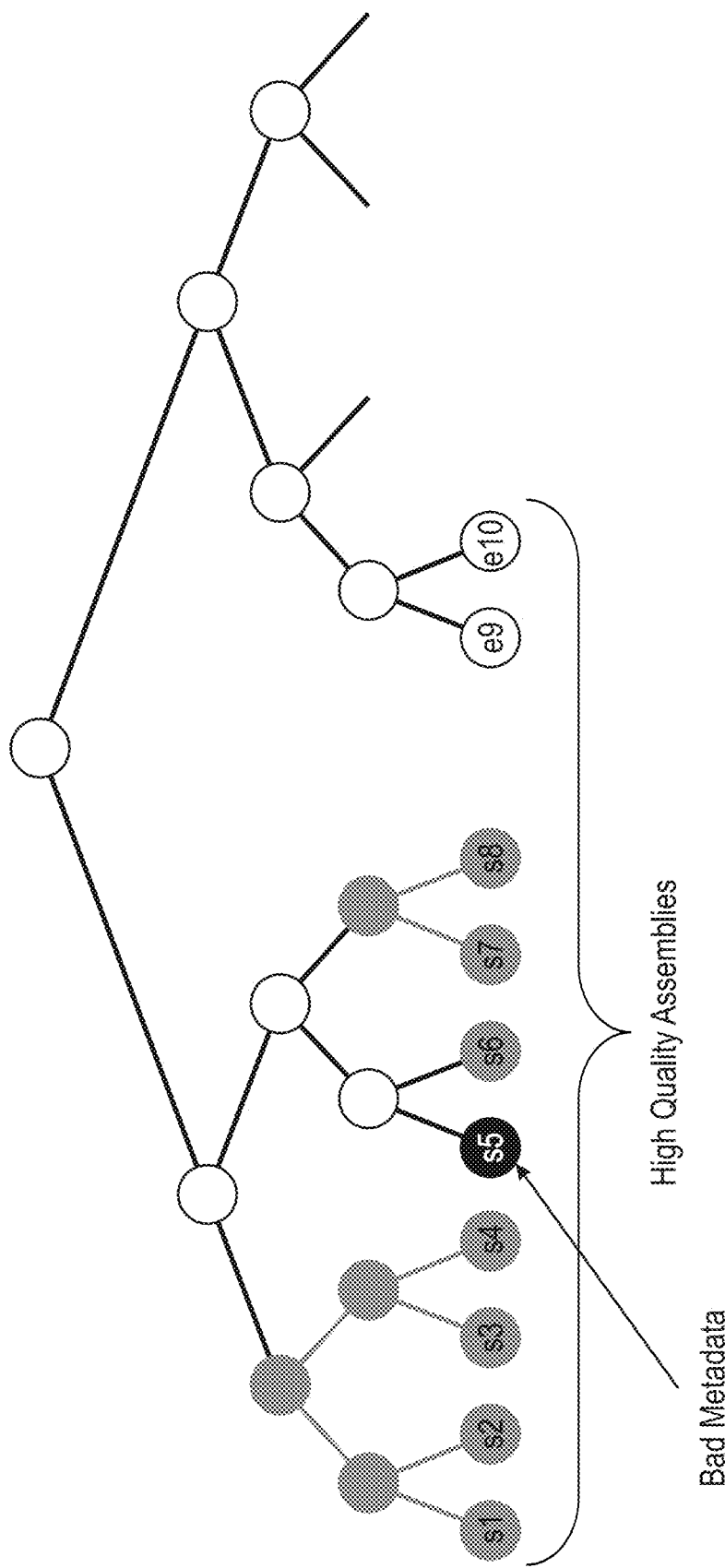
FIG. 4 is a portion of a tree diagram illustrating how a self-consistent taxonomy makes it possible to separate the problem of database construction from the problem of bad metadata. Although the $S_5$ genome contains bad metadata, the disclosed self-consistent taxonomy places the $S_5$ genome on the correct leaf node.

The self-consistent taxonomy circumvents misclassifications of the reference taxonomy as illustrated in the portion of a tree diagram illustrated in FIG. 4. Here, a series of genomes labeled s1-s4 and s6-s8 are clustered together in the self-consistent taxonomy because their genotypes are in fact similar to each other (e.g., they are all *Salmonella* genomes). The genome s5 has metadata that "labels" it as *Escherichia*, but that information is not used to determine classification in the self-consistent taxonomy. Only the genetic distance is used, and since the genome s5 is in fact an example of a *Salmonella*, s5 becomes clustered with the other members of the *Salmonella* genus in the self-consistent taxonomy despite being incorrectly labeled in the metadata as *Escherichia*.

In the example of FIG. 4, the taxonomy is represented as a "binary tree", the typical output structure for a hierarchical clustering algorithm. In a binary tree structure, each parent node can have two child nodes. Each node of the self-consistent taxonomy is assigned a map relating a set of reportable reference IDs to that node's self-consistent ID. Leaf nodes in the reference binary tree (FIG. 4) have only one genome. Therefore, a given leaf node of the self-consistent taxonomy has only one reference ID mapping to one self-consistent ID. Higher level "parent nodes" (interior nodes) of the self-consistent taxonomy, identified by a single unique self-consistent ID, contain a "taxonomy map", which links each reference ID found below a given parent node with the number of child nodes in which that reference ID occurs.

In summary, a given record of the self-consistent k-mer database comprises a k-mer, a self-consistent ID assigned to the k-mer, one or more reference IDs of the reference taxonomy mapped to the self-consistent IDs of the self-consistent taxonomy, respective weights and/or respective probabilities of each of the reference IDs, and other optional data of the reference database if desired.

Condensing the Taxonomy

With this mapping, it is possible (optionally) to condense the tree in every place where the metadata are consistent with the self-consistent taxonomy and pairs of nodes within the binary tree have the same reference ID. Any node whose taxonomy map contains one and only one reference ID can be trimmed so long as its parent node contains one and only one reference ID. This effectively condenses the tree by combining all similar genomes with the same reference ID onto one node. It also preserves the child node "count" that reflects the quantitative weight of evidence below a given parent node. After this condensation step, a given node on the tree has its own unique self-consistent ID and a taxonomy map associating each reference ID with a weight equal to the number of genomes with that reference ID at or below the given node. The mapping is illustrated in Table 1. Each weight of Table 1 can have a whole number value greater than or equal to 1.

TABLE 1

| | | | | | | |
|---|---|---|---|---|---|---|
| self-consistent $ID_a$ | reference $ID_i$ | $weight_i$ | reference $ID_j$ | $weight_j$ | reference $ID_k$ | $weight_k$ |
| self-consistent $ID_b$ | reference $ID_x$ | $weight_x$ | | | | |
| self-consistent $ID_c$ | reference $ID_y$ | $weight_y$ | reference $ID_w$ | $weight_w$ | | |

As a non-limiting example, a self-consistent k-mer database designed to identify organisms at the species level can have a high level parent node having 1000 linked child nodes all containing the reference ID of one single species (e.g., *Salmonella enterica*). In this instance, the 1000 linked child nodes of the self-consistent k-mer database can be removed, leaving the high level parent node linked to a reference ID for *Salmonella enterica* having a weight of 1000.

Figure 5:
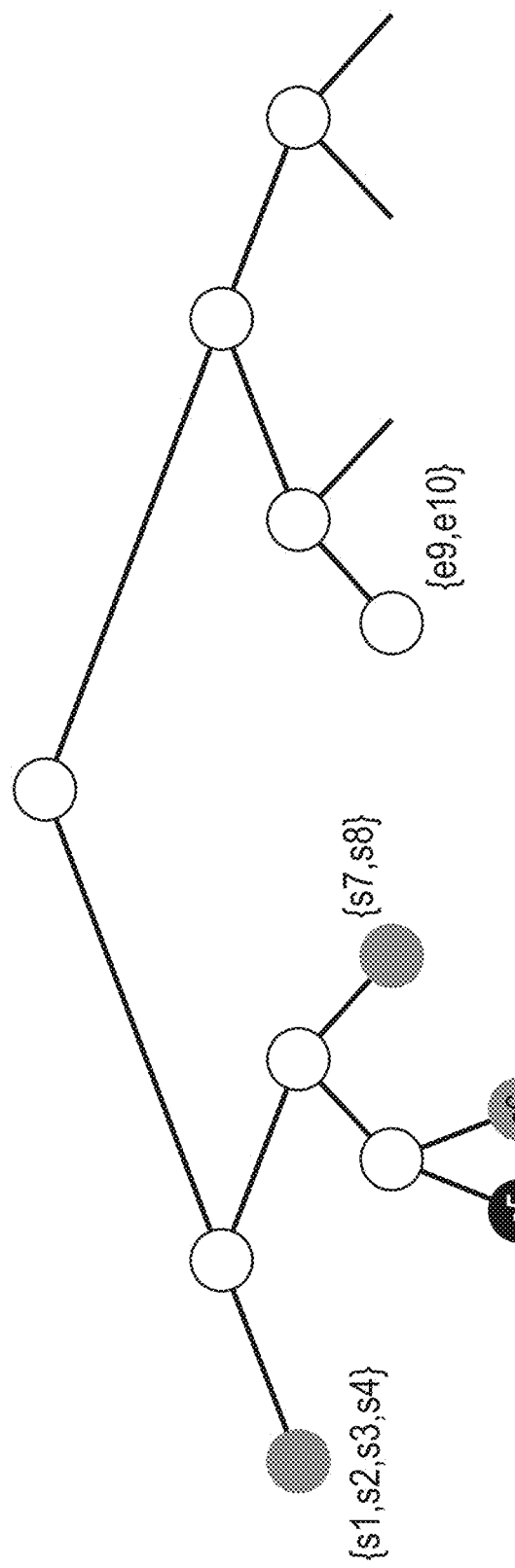
FIG. 5 is a portion of a tree diagram illustrating condensation of nodes of the taxonomic tree when the database utilizes self-consistent taxonomic IDs. The taxonomy can be condensed, taking advantage of every place a reference taxonomy is correct, by grouping all leaf nodes with common reference IDs onto one tree node.

An important feature of this approach to condensation is that it takes advantage of every place the self-consistent taxonomy is in agreement with the reference taxonomy and yet is robust against errors of the reference taxonomy. FIG. 5 again shows genome s5, which is *Salmonella* but is incorrectly labeled as *Escherichia*. Using the method described above, if this error is left uncorrected, then that part of the taxonomic tree is left expanded. This means the unique k-mers do not move up to a higher taxonomic level (e.g., lowest common ancestor), thereby preserving the specificity of the database with respect to the self-consistent taxonomy. When the database is used to identify organisms within a metagenomic sample, the evidence for all possible reference IDs is reported based on the weights associated with that ID. In the case of a sample containing *Salmonella enterica*, the reads with k-mers unique to *Salmonella enterica* will be reported (post-process) in the reference taxonomy as the reference ID for *Salmonella enterica* with a weight of 1000, and *Escherichia* with a weight of 1. The probability of *Salmonella enterica* is then 1000/1001 while the probability of some *Escherichia* strain is only 1/1000. Thus the database report is robust against errors in the metadata. Database performance can be further improved by correcting those metadata errors.

Discontinuities of the reference taxon mapping in the self-consistent taxonomy can be favorably used to identify clerical errors and/or apparent errors of the metadata of the reference databases, reveal inaccuracies in the reference taxonomy structure, discover gene movement between organisms (i.e., horizontal gene transfer) that re-orients the organism into a new taxon category, and/or highlight areas of the taxon and database construction that needs attention for correction in order to increase accuracy of the self-consistent k-mer database. Moreover, the self-consistent k-mer database can be designed to be sensitive to specific reference taxon levels by collapsing or expanding taxon nodes based on common reference IDs.

Reporting

FIG. 6 is a sample of tabulated probabilistic report data available after k-mer analysis of sample data using the self-consistent k-mer database. The first column in the report table contains the self-consistent IDs of the database, and the second column contains the number of k-mers (or, alternatively, number of reads), assigned to each self-consistent ID. The subsequent columns are paired and enumerate all of the reference IDs linked to each self-consistent ID along with the probability assigned to each of the linked reference IDs. If there is only one linked reference ID, its probability is 1.0. If there are multiple linked reference IDs, then their probabilities add to 1.0.

Reporting can then be done by providing a probabilistic report such as, for example, the product of each reference ID probability with the k-mer or read count for each reference ID, and totaling by reference ID for all IDs, or by applying other rules (e.g., summing only the reference IDs with greatest probability at each self-consistent ID.

Taxonomic Profiling Using the Self-Consistent k-Mer Database

This section describes a method of profiling nucleic acids of a sample using the self-consistent k-mer database, preferably in conjunction with a computer system. The method is depicted in the flow diagram of FIGS. 7A-7G.

A sample is provided for analysis containing nucleic acids of one or more organisms therein (FIG. 7A). The nucleic acids can be of eukaryotic and/or prokaryotic origin. In an embodiment, the sample comprises nucleic acids of one or more prokaryotic microorganisms. Non-limiting examples of samples include water samples obtained from tap water, lakes, streams, field runoff, and sewage; swabbed samples from contact surfaces (e.g., building surfaces, countertops, furniture, utensils, clinical instruments, computer hardware, cell phones, door handles, doors, windows, screens, cabinets, cabinet doors, sinks, faucet); animal samples (e.g., blood, blood plasma, serum, cells, a cellular extract, a cellular aspirate, expectorant, sputum, saliva, mucous, urine, sweat, tears); and samples obtained from food, food-handling equipment, and surfaces contacted by food. The samples can be a solid or liquid containing water or no water.

RNA and/or DNA can be extracted from the working sample and subjected to high throughput sequencing (FIG. 7B).

Optionally, quality control of sequence data of the working sample is performed by removing data of poor quality, removing sequences introduced by the sequencing methodology, and/or removing any contaminating sequences (FIG. 7C).

Optionally, the sequences are assembled to contigs (FIG. 7D). K-mers of the sequences/contigs are then mapped to the genomes of the self-consistent k-mer database (FIG. 7E). The contigs can be mapped to the reference genome using Burrows-Wheeler transformation based method or a similar technique.

The per-position-coverage and windows of the mapped sequences or mapped contigs are then determined (FIG. 7F). Coverage thresholds for the mapped sequences or mapped contigs are then calculated. Optionally, the mapped sequences or mapped contigs can be filtered based on coverage threshold. Optionally, the sequence coverage data can be smoothed using a generic method (e.g., LOESS) to remove coverage spikes arising from technical biases. A more specialized method that takes into account specific genome characteristics can also be used if that information is available. From the coverage data, at least one organism of the sample is identified (FIG. 7G).

Metagenomic and metatranscriptomic sequences obtained by high throughput sequencing of an environmental sample can be passed to publicly available intermediary programs such as BLAST for aligning k-mers of the sequences of the environmental sample to the k-mers of the self-consistent k-mer database, thereby identifying which organisms of the self-consistent taxonomy, if any, are most likely to be present in the sample. Optionally, the intermediary program can conduct alignment of sequence data of the sample to raw sequences, contigs, and/or whole genomes from which the k-mers of the self-consistent k-mer database originated in order to increase specificity of the organism identification. The intermediary program can perform a simple database search on a sample sequence, or alternatively, conduct pairwise sequence alignments, multiple sequence alignments, and/or pairwise genome alignments.

Other non-limiting software programs for aligning metagenomic and metatranscriptomic sequences to the sequence data of the self-consistent taxonomy include FASTA (simple search), ALLALIGN (pairwise, multiple alignments), BLASTZ (pairwise), DNASTAR (pairwise, multiple), AVID (pairwise genome), GMAP (genome alignment), and MGA (multiple genome alignment).

Queries

This section generally applies to searches other than for classification purposes. For comparison, in a Kraken classification search, the data to be classified (e.g., a read) is processed to extract from it every k-mer in the read. Each k-mer is then compared to the entire reference k-mer database and if there is a hit, then a counter representing evidence for the taxonomic ID of the node it hits is incremented. When this is complete, the total hits from all k-mers are tallied and summarized in a report by node ID. Any k-mer in the read but not in the database is tallied as "not found."

In a search other than for classification purposes, queries can be performed on metadata information (e.g., author, date, source of the sequences, etc.), on the k-mers, on the nucleic acid sequences from which the k-mers originated, on contigs of the nucleic acid sequences, on whole genomes assembled from the sequences, and/or on combinations of any of the foregoing. The k-mers, the nucleic acid sequences, the contigs, and the whole genomes can be stored in the same data table or in separate electronic files (e.g., text files such as FASTA or compressed text files such as FASTQ) that are relationally linked by index keys (e.g., the self-consistent IDs). No restriction is placed on the types of queries that can be performed, providing the queries do not exceed the limits of the information contained in the self-consistent k-mer database and any additional tables linked thereto. Queries can be performed by manual entry of search terms, by search terms generated programmatically, or by combinations thereof.

The self-consistent k-mer database can be located at sites available to the general public and/or to specialized groups (e.g., academic, medical, forensic, environmental, governmental, and/or military). Sites include private, corporate, and/or public websites for conducting online searches. Alternatively, the self-consistent k-mer database and linked additional tables can be downloaded and stored at a local site for conducting queries using a local computer network.

Searches can be conducted at a low level using the database management software used to create the database files, opening the self-consistent k-mer database and any additional linked tables manually and searching the opened files using command statements entered manually. Preferably, searches are performed using an intermediary software program designed to collect search terms using a graphical user interface, programmatically organize the search terms into valid query statements, open the database files, conduct searches on the database files based on the query statements, and report the results in an organized format, which can be in the form of an electronic file stored to a storage device, data displayed on a monitor, data sent to an output device (e.g., printer), and/or data passed to another program for further analysis and/or handling. Identifying suspicious metadata and misclassified genomes in a self-consistent k-mer database.

Summary of the Above Method

The present work began by downloading raw sequences of approximately 360,000 genomes (referred to herein as "sample genomes") stored in the SRA at the NCBI website. The sample genomes had been previously classified using the standard NCBI taxonomy (the reference taxonomy), which is based on the classifications of the genomes of RefSeq database at NCBI.

The raw sequences of the 360,000 sample genomes were submitted to various quality control steps, yielding "cleaned" sample sequences of approximately 170,000 sample genomes. A matrix of genome-genome distances was calculated for every pair of the 170,000 whole genomes assembled from the cleaned sample sequences. A new self-consistent taxonomy was generated based on the genetic distances using an agglomerative hierarchical clustering algorithm, and the k-mers of the cleaned sample sequences were assigned respective taxonomic IDs (i.e., self-consistent IDs) corresponding to nodes of the new self-consistent taxonomy. A given k-mer can occupy only one node of the self-consistent taxonomy, the lowest common ancestor (LCA) node of the k-mer. A self-consistent k-mer database was then constructed containing the classified k-mers of the sample genomes and their associated self-consistent IDs. Any k-mers that could not be classified remained unclassified. This database is referred to as the 170K database.

Next, the genomes of the reference database (i.e., the approximately 7000 reference genomes of the RefSeq Complete) were re-classified against the self-consistent taxonomy of the 170K database, while carrying forward metadata and taxonomic IDs (i.e., the "reference IDs") of the reference taxonomy. As a result, each of the self-consistent IDs of the self-consistent taxonomy was linked to one or more reference IDs and named organisms of the reference database. This linkage preserved the reference taxonomy labeling while making the self-consistent k-mer database insensitive to the errors of the reference taxonomy.

The 170K database was then condensed to remove pairs of child nodes sharing a common reference ID if the parent node contained only the one reference ID. A second k-mer database was constructed containing 164,714 sample genomes plus RefSeq genomes re-classified in the self-consistent taxonomy. Each k-mer had a self-consistent ID linked to one or more reference IDs, associated weight/ probabilities of each reference ID, and any metadata carried forward with the reference IDs. The second self-consistent k-mer database is referred to as the 165K database.

Effect of Metadata Errors

Figures 8A, 8B:
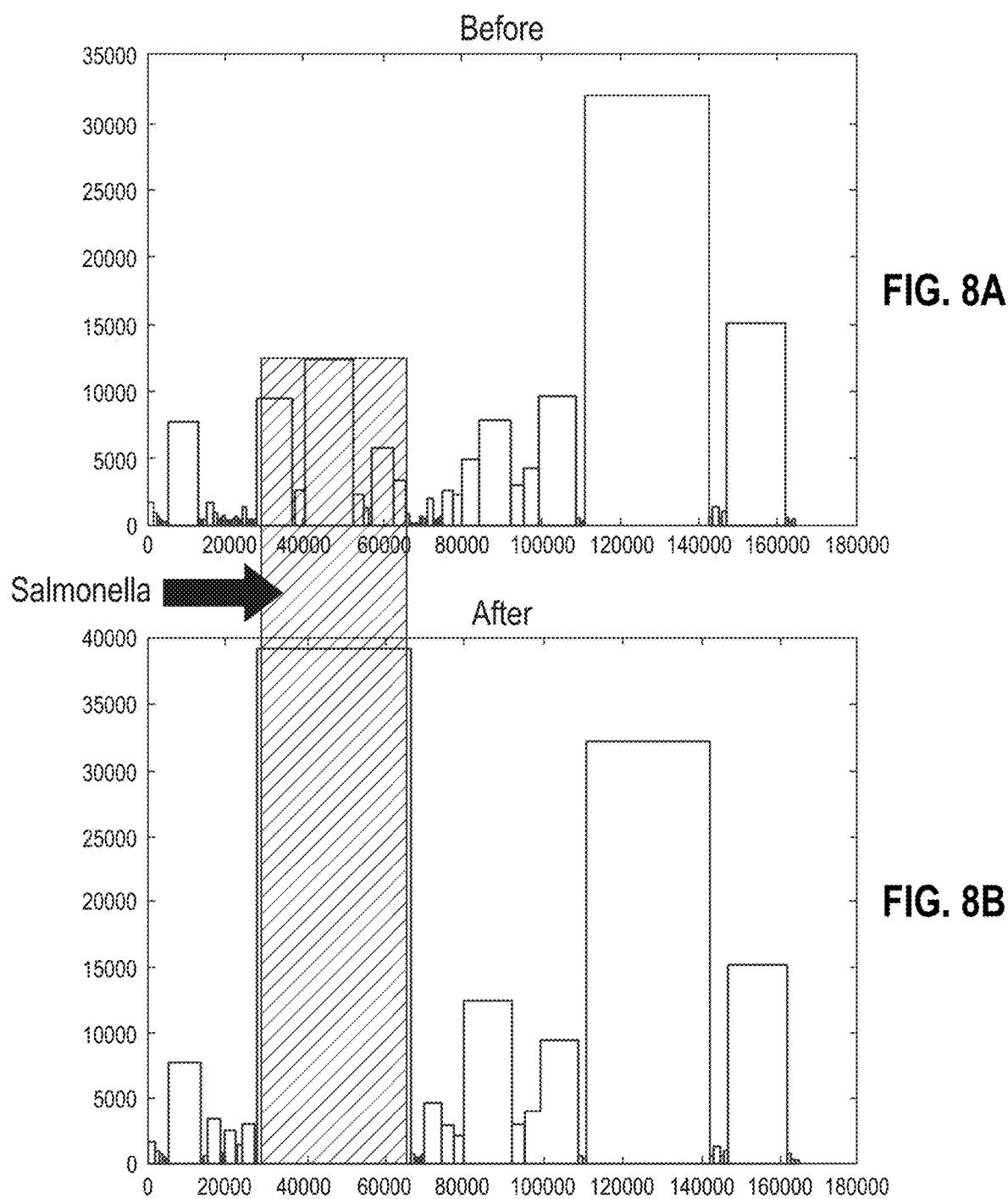
FIGS. 8A-8B are bar graphs showing that genomes erroneously assigned incorrect taxonomic IDs may cause what should be large contiguous cluster of genomes with the same ID to be broken up.

The 165K database nevertheless has deficiencies. The hierarchical clustering algorithm operating on a matrix of genome-genome distance provides a sorting of genomes that clusters similar genotypes together. However, due to inaccuracy of the reference taxonomy, not all genomes of the same genus will group in a single contiguous block in the self-consistent taxonomy. FIGS. 8A and 8B are bar graphs of taxonomic cluster sizes for the 164,714 hierarchically clustered genomes. The x-axis is simply the genome count or accession number in the order created by the hierarchical clustering algorithm. The y axis represents a count of adjacent genomes assigned the same self-consistent ID at a chosen rank (genus) and having the same assigned genus based on the metadata carried forward from the reference taxonomy. The cluster of genomes assigned a self-consistent ID corresponding to *Salmonella* is represented by the shaded region of FIG. 8A. The *Salmonella* region is further broken down into sub-clusters of genomes based on the genus assigned in the metadata. Some of the sub-clusters are correctly labeled *Salmonella* in the metadata, others are not. The boundaries between the squares of the shaded region indicate a change in the genus assigned in the metadata. Thus, each square of the shaded region represents a count of *Salmonella* genomes (based on self-consistent ID) assigned to a common genus (*Salmonella* or another) in the metadata.

In many cases, discrepancies between the metadata are simply due to clerical errors in metadata. In other cases, there are unusual genomes (e.g., chimeric genomes) and genomes with horizontally transferred genes and plasmid that cause discrepancies using the standard taxonomy. A "chimeric genome" is defined herein as a genome composed of joined DNA fragments originating from two or more different genera (i.e., different branches of the taxonomic tree), which result in a viable organism. Standard taxonomic IDs (on which federal reporting requirements are based) do not accurately reflect the true genotypes of chimeric genomes. Inaccurately named genomes cause fragmentation of what should be contiguous clusters with a common taxonomic identity. FIG. 8B shows that after correction of the classification errors in the metadata, much larger contiguous blocks are formed (e.g., the large block of *Salmonella* genomes).

FIG. 9 is a partial report showing the actual clusters obtained for a sample set of genus-ranked taxonomic IDs (self-consistent IDs) of the 165K database. For each separate cluster the report lists the group by cluster size (from large to small). The taxonomic ID=590 represents the genus *Salmonella*. There are a total of 39,204 *Salmonella* genomes which, after hierarchical clustering, are placed in sixteen separate clusters, one of size 39167, one of size 9, one of size 4, three of size 3, and five of sizes 2 and 1, respectively. For any taxonomic ID, the larger clusters most likely reflect real variation in genotype. On the other hand, very small clusters (e.g., of size 1 or 2) indicate the classification of the genomes is "suspect", although not necessarily wrong. The metadata may be incorrect (so the genome could be correctly placed but given a wrong name or ID), the genome-genome distance computed for that genome could be inaccurate, or the genome might be a rare genotype.

Method 1. Automatic and Self-Consistent Correction of Metadata Errors

The following describes a method of automatically and self-consistently correcting metadata errors and confirming true rare genotypes in the self-consistent k-mer database comprising genomes classified by genetic distances.

This method begins by providing a first self-consistent k-mer database (first database) as described above. The first database comprises k-mers of nucleic acid sequences of one or more genomes of one or more organisms. The k-mers are taxonomically classified based on genetic distance, and the k-mers are assigned self-consistent IDs corresponding to nodes of a self-consistent first taxonomy. At least one self-consistent ID is linked to two or more clusters of genomes based on differences in assigned taxonomic labels in the metadata of the genomes, wherein a given cluster comprises at least one genome. The first database comprises at least one genome whose metadata has an incorrect taxonomic label in the self-consistent first taxonomy.

Cluster size means the number of genomes in a cluster. A minimum cluster size, Cmin, is defined for each self-consistent ID of the first database. Cmin is a positive whole number greater than 0, more specifically greater than or equal to 3, and even more specifically greater than or equal to 10. A given cluster whose size is below Cmin is considered "suspect". Each self-consistent ID can be assigned a different Cmin.

All genomes in clusters having sizes less than Cmin are removed from the first database, thereby generating i) a set of remaining genomes and ii) a set of removed genomes.

A list of all accession numbers of the removed genomes is created. An accession number in bioinformatics is a unique identifier given to a sequence record to allow for tracking of different versions of that sequence record and the associated sequence over time in a single data repository.

A self-consistent second taxonomy based on genetic distance is computed as described above using only the set of remaining genomes.

A self-consistent second k-mer database (second database) is built using the self-consistent second taxonomy and the remaining genomes.

Next, each of the removed genomes is re-classified independently (i.e., treated as a separate sample) against the self-consistent second taxonomy of the second database. Following the re-classification, each of the removed genomes can have k-mers that map to nodes of the self-consistent second taxonomy and/or k-mers that remain unmapped to the self-consistent second taxonomy. A primary leaf node contains the most mapped k-mers of a given re-classified removed genome compared to other leaf nodes of the second taxonomy. After the re-classification, the following variables $N_k$, $N_L$, $N_I$, $N_U$, $L_{max}$, $L_{other}$, S, $R_U$, $R_I$, $R_U^{max}$, $R_I^{max}$, and $S_{min}$ are defined for each of the removed genomes:

i) $N_k$ is the total number of k-mers of the removed genome, where $N_k$ is a positive whole number greater than 0;

ii) $N_L$ is the number of k-mers of the removed genome that map to leaf nodes of the self-consistent second taxonomy, where $N_L$ is a positive whole number greater than or equal to 0;

iii) $N_I$ is the number of k-mers of the removed genome that map to interior nodes of the self-consistent second taxonomy, where $N_I$ is a positive whole number greater than or equal to 0;

iv) $N_U$ is the number of k-mers of the removed genome that remain unmapped, (i.e., are not in the second database), where $N_U$ is a positive whole number greater than or equal to 0;

v) $L_{max}$ is the number of k-mers of the primary leaf node, where $L_{max}$ is a positive whole number greater than or equal to 0;

vi) $L_{other}$ is the sum of all k-mers mapping to all leaf nodes other than the primary leaf node of the self-consistent second taxonomy, where $L_{other}$ is a positive whole number greater than or equal to 0;

vii) $S=L_{max}/L_{other}$, where S is the leaf node specificity of the removed genome in the self-consistent second taxonomy and S is "inf" (i.e., undefined) if $L_{other}=0$;

viii) $R_U=N_U/N_k$, where $R_U$ is the unmapped k-mer ratio of the removed genome, and $R_U$ is a number greater than or equal to 0 and less than or equal to 1; and ix) $R_I=N_I/N_K$, where $R_I$ is the interior k-mer ratio of the removed genome, and $R_I$ is a number greater than or equal to 0 and less than or equal to 1;

It should be understood that $N_L$ and $N_I$ can both be zero only if the removed genome has zero mapped k-mers in the second database (i.e., $N_k=N_u$).

Next, the following values are set by the end user or software program:
- x) $R_U^{min}$ is the minimum unmapped k-mer ratio $R_U$, where $R_U^{min}$ is a number greater than or equal to 0 and less than or equal to 1;
- xi) $R_I^{max}$ is the maximum interior k-mer ratio $R_I$, where $R_I^{max}$ is a number greater than or equal to 0 and less than or equal to 1; and
- xii) $S_{min}$ is the minimum leaf node specificity S of the removed genome, where $S_{min}$ is a number greater than or equal to 0 (and can be inf);

Using the above definitions, a decision is made with respect to each of the removed genomes based on the following conditions:
- a) if $R_U < R_U^{min}$ (i.e., fewer than $R_U^{min}$ new k-mers were found in a given removed genome) and $S >= S_{min}$ (i.e., the accession of the removed genome is specific to one particular leaf node of the self-consistent second taxonomy), then the metadata for the removed genome is declared in error, the removed genome is moved to the leaf node corresponding to $L_{max}$, and the metadata of the removed genome is corrected to match the taxonomic ID corresponding to $L_{max}$;
- b) if $R_U >= R_U^{min}$, then the removed genome has new k-mer content and might be an unusual genotype, in which case the removed genome can be added to the second k-mer database at the node it was assigned in the reference taxonomy;
- c) if $R_U <= R_U^{min}$ the removed genome has little new k-mer content and can be left removed; or
- d) if $R_I <= R_I^{max}$ the removed genome has excessive non-specific interior k-mer content and can be left removed.

Following the self-consistent error corrections and unusual genotype placement the second database can be rebuilt as described above to include the newly corrected and placed genomes (i.e., including calculating a new self-consistent taxonomy (third taxonomy) based on genetic distances of all the genomes of the second database and the newly corrected and placed genomes), thereby forming a self-consistent third k-mer database (third database). The above method can be implemented automatically, by manual input, or both. The method is adaptable to machine learning.

Chimeric Genomes

There is a further more subtle complication in curating a self-consistent k-mer database constructed based on any taxonomic "tree." Bacteria can undergo horizontal gene transfer, in which instances of DNA and genes from one species, or even a genus, can transfer to other species or genera. In these instances, the "tree of life" is not a tree but a taxonomic graph with loops in which the branches can become indistinct or ambiguous. However, US federal regulations require reporting based on standardized tree-like taxonomies. If a chimeric genome (e.g., a bacterium in which half the circular chromosome is from *Escherichia* and half from *Salmonella*) is added to the self-consistent database using a tree-like taxonomy, all of the unique k-mers from the chimeric genome that match *Escherichia* and *Salmonella* will move up to the LCA node on the tree for these two genera, and the tree will lose the ability to distinguish the two genera. This is distinct from a metadata "error" as described above because the genome is genuinely chimeric.

The resolution to this problem is to identify and place the rare chimeric genomes in a separate "exotic" genome database before adding them to the self-consistent k-mer database. This can be accomplished by validating or filtering all genomes before adding them to the collection for incorporation into the self-consistent k-mer database. To do this, each contig of a candidate genome assembly is treated as a genome to be read and classified against the existing self-consistent k-mer database without that candidate genome. This step is not affected by metadata errors of the candidate genome. The output of such a filtering step will indicate:
1) All k-mers of the contig that map to known k-mers in the database;
2) The database node or nodes to which each kmer matches; and
3) The number of new k-mers brought in by the contig (i.e., k-mers not already in the database)

In step 2, some k-mers will map to higher ranks of the self-consistent taxonomy and some to lower ranks. A k-mer can map to more than one genus node. In general, however, the vast majority of k-mers of a typical genome will map to one genus node. For a chimeric genome, the k-mers will map to two or more genera nodes. The number of k-mers of all the genomes of the self-consistent k-mer database that would move to the LCA if the chimeric genome was added to the database is given by the number of k-mers of the chimeric genome mapping to a second genus node. This number can be compared to the number of new k-mers brought in to determine the cost/benefit of including the chimeric genome in the self-consistent k-mer database. A truly chimeric genome does contain a large number of new k-mers but causes a large fraction of existing k-mers of the other genomes of the database to move to up to a LCA. This fraction varies by genus.

Figure 10:
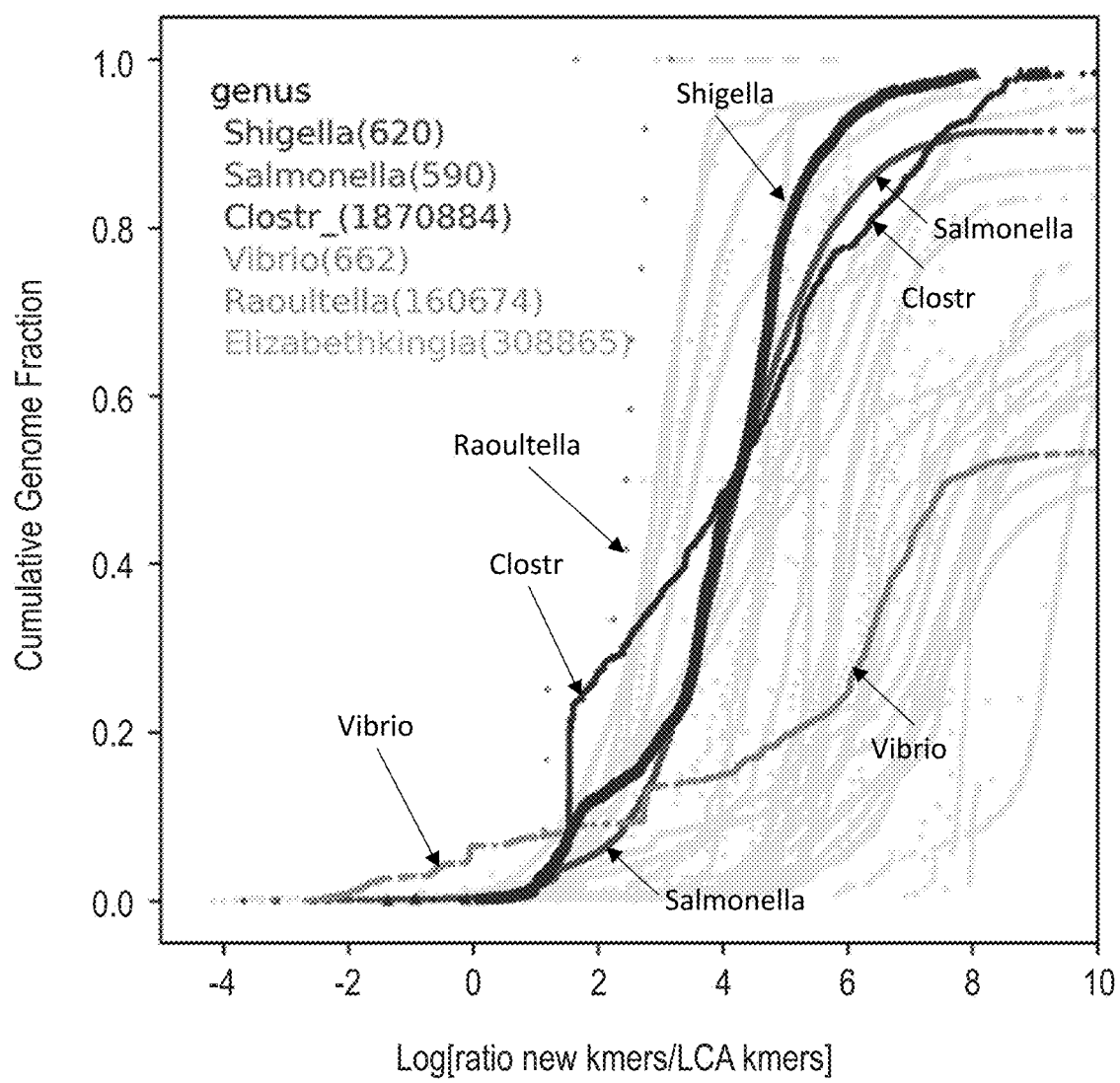
FIG. 10 is a graph showing the cumulative fraction of genomes that would move up to a lowest common ancestor (LCA) above genus if a chimeric genome was added to the database, plotted as a function of the log ratio of new k-mers added to existing k-mers moving up to the LCA ("LCA kmers"). Each curve represents a different genus.

As an example of the cost benefit, the graph of FIG. 10 shows the cumulative fraction of genomes that would move up to a lowest common ancestor (LCA above genus) if the chimeric genome was added to the database, plotted as a function of the log ratio of new k-mers added to existing k-mers that would move up to the LCA ("LCA kmers"). In this example the database used is the standard from NCBI (RefSeq Complete). Each curve of FIG. 10 represents a different genus. The data represent over 170,000 new genomes from 60 different genera. Several genera are highlighted. In this example, genomes from the genus *Vibrio* (ID=662) are causing a large fraction of k-mers to move up to the LCA when the log ratio is less than 0 (i.e., (new k-mers)/(LCA k-mers)<1). This tail can be truncated by selecting genomes of the genus *Vibrio* with a ratio of new k-mers/LCA k-mers greater than a specified threshold (e.g., 10, or 1.0 on the log scale). The chimeric genomes falling below this threshold are withheld, but can be used to build the aforementioned "exotic" k-mer database.

Figure 11:
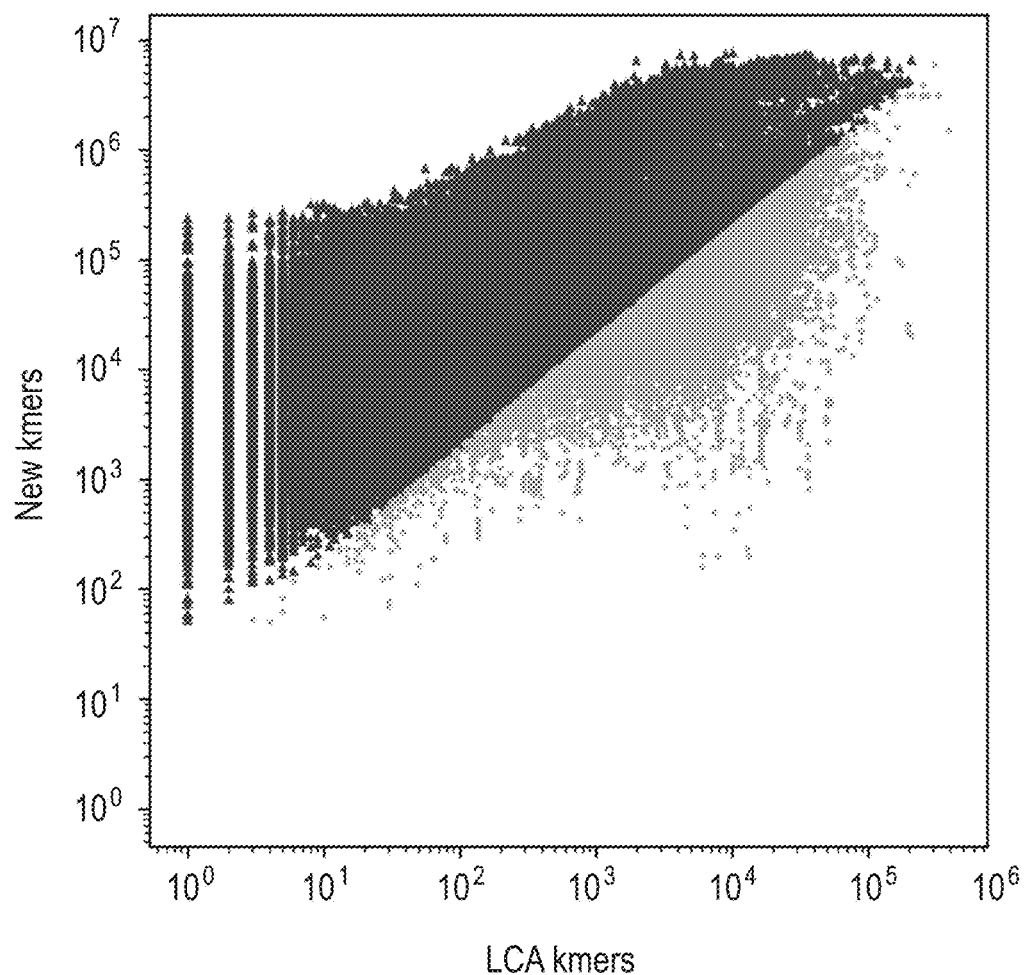
FIG. 11 is a scatter plot of the number of new k-mers of the removed genome that would be added if the removed genome was added to the genome database as a function of the number of k-mers that would move up to lowest common ancestor (LCA) for 164,714 genomes, where each filled circle represents one genome. The genomes represented by points in dark gray bring in twenty times more new information than information they would cause to move up to the LCA.

FIG. 11 is a scatterplot of new k-mers added to the database versus LCA k-mers, each plotted on a log scale. The data show that selecting only genomes with a (new k-mers)/(LCA kmers) ratio greater than 20:1 excludes 12% of genomes from the new genome set (indicated in light gray shading). The genomes in light gray shading represent the most chimeric genomes (~20,000 genomes). Rebuilding the database with the remaining ~150,000 genomes produces a new self-consistent k-mer database (Kraken database) with many more useful k-mers (i.e., k-mers at leaf nodes that can be used to make more specific calls).

Figure 12:
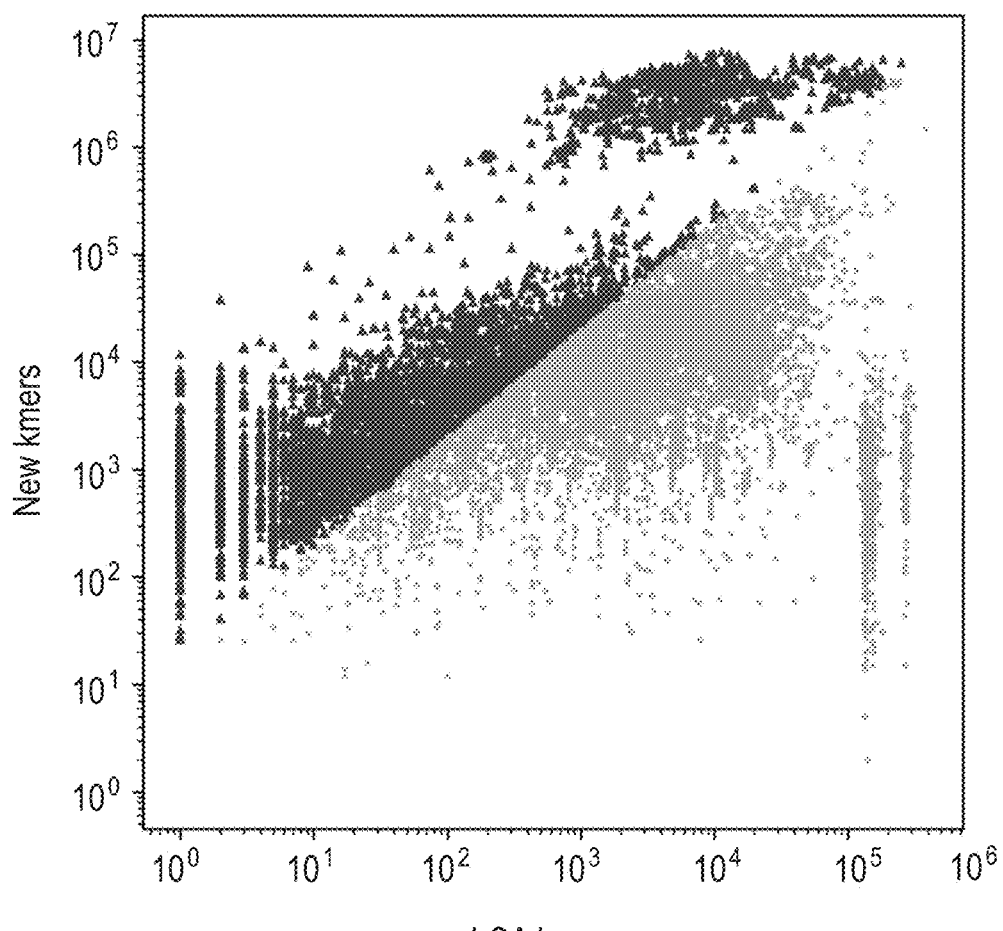
FIG. 12 is a scatter plot showing the new kmers that could be added versus the number of k-mers that would move up to the LCA (LCA k-mers) if the re-classified 20,000 removed chimeric genomes were added back to the genome database, where each filled circle represents one genome.

Some of the k-mers that do move up to the LCA from the newly added genomes are common both to the genomes added and the genomes withheld. Therefore, once the new self-consistent k-mer database is constructed, it is possible to re run (re-evaluate) the 20,000 most chimeric genomes withheld against the new larger database. A plot of the re-evaluated chimeric genomes is shown in FIG. 12. The scatter plot shows the new k-mers that could be added versus the number of LCA k-mers by genome for the 20,000 genomes. As in FIG. 11, the points in dark gray, representing 9000 of the 20,000 withheld genomes, have a ratio of (new k-mer)/(LCA k-mer) greater than 20:1 and can be safely added to the database, and the genomes in light gray can be dropped or withheld. The cluster of dark gray genomes above $10^6$ new k-mers are particularly valuable in the large amount of new k-mers they bring.

FIG. 13 is a partial report showing the increase in database k-mers by genus (in comparison to Ref-Seq Complete) using the above method, whose logical flow is shown below as Method 2. The "kmer ratio (stage 6/rsc)" of FIG. 13 is the ratio of the columns "New Database)/"Ref Seq C". Rebuilding the database with high new information content genomes included yields an even more selective database with larger resolution. The process in Method 2 may be iterated. The iteration has diminishing returns as the finite number of non-chimeric new genomes are included with each iteration. The information content of the new database (see FIG. 13, column 5) can be measured with each iteration to determine when the maximum information content is reached.

Method 2: Automatic Removal of Chimeric Genomes

This method begins with a collection of new sample genomes and a defined taxonomic target rank selected from the group consisting of domain, kingdom, division, phylum, class, order, family, genus, species, sub-species, and strain (e.g., genus). Also defined is a minimum (new k-mer):(LCA k-mer) ratio (e.g., 4:1, 8:1, 16:1, 20:1).

Contigs are formed of the sequence data of a given new genome. Metadata errors are removed from the given sample genome (e.g., using Method 1 as described above). The given sample genome is then classified (e.g., using a Kraken classifier) against a self-consistent first database having a self-consistent first taxonomy based on genetic distance where each contig is treated as one read. The first database can include RefSeq Complete genomes re-classified and having corrected metadata as described above.

The classifier output is then summarized for all contigs of the given sample genome, resulting in a report of the number of k-mer hits at the target rank (e.g., genus) and above for the given sample genome. The number of new k-mers of the given sample genome that are not in the first database is determined, designated $N_k$. The count of k-mers by node at the target rank (e.g., genus) is also determined. For non-chimeric genomes only one node at the target rank (e.g., genus) will be hit. For chimeric genomes there will be k-mer hits to multiple nodes. A primary node for the given sample genome at the target rank has the most k-mer hits. The sum of k-mer hits at nodes other than the primary node, designated $Y_k$, is calculated. $Y_k$ defines the number of "LCA k-mers" for the given new genome (i.e., k-mers that would move up to the LCA and cause other k-mers to move up to the LCA if added to the database).

For the given sample genome, the $N_k:Y_k$ ratio is calculated (i.e., new k-mer:LCA k-mer ratio). If the given sample genome has a (new k-mer):(LCA k-mer) ratio (i.e., $N_k:Y_k$ ratio) greater than or equal to the above-defined minimum (new k-mer):(LCA k-mer) ratio, the given sample genome is added to the first database; otherwise the given sample genome is withheld.

A new taxonomy is calculated using the above-described procedures, thereby forming a self-consistent second database having a self-consistent second taxonomy.

The process is repeated for each sample genome.

Optionally, the above-described process for handling chimeric genomes can be repeated using the withheld genomes, classifying the withheld genomes against the new, larger, database (second database), thereby generating a self-consistent third database and self-consistent third taxonomy. Iterations of the process can continue until database information content (k-mers/target rank node) is maximized or until the desired information content is reached.

A Method of Correcting a Classification Database

An alternative and complementary approach to handling metadata errors is to use an existing taxonomy to automatically correct a classification database (e.g., RefSeq Complete), doing so in a way that is robust to metadata errors. A classification database is a reference database comprising genomes that is used to profile and identify sample genomes.

Figure 14:
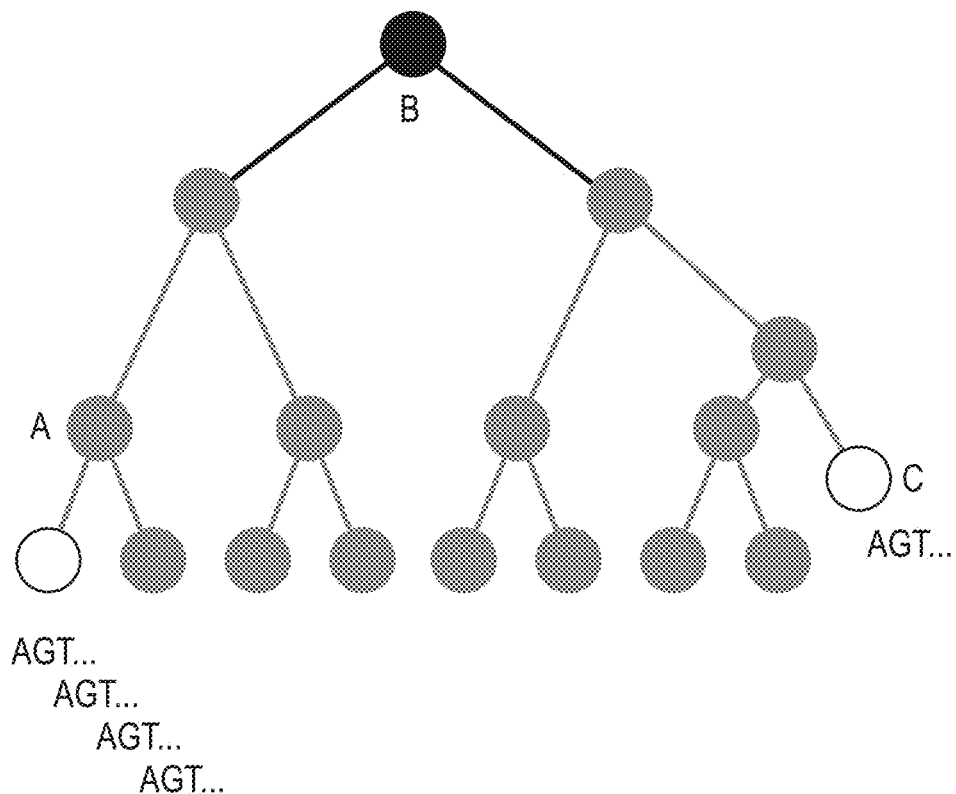
FIG. 14 is a portion of a tree diagram illustrating how a genome that has been labeled incorrectly as a species in the taxonomic tree from others of similar genotype can cause the LCA for its k-mers to be far up the tree in rank, losing sensitivity.

A standard method for assigning taxonomic IDs to k-mers, when creating a k-mer-based classifier, is to assign to a k-mer the taxonomic ID of the lowest common ancestor (LCA) of the leaf node genomes that include the k-mer. The taxonomic tree is typically a binary tree as described above, the binary tree having subtree portions rooted at various nodes. When a genome has been labeled incorrectly as a species in the taxonomic tree from others of similar genotype, the LCAs for its k-mers can move far up the tree in rank, causing the taxonomic tree to lose sensitivity. This is illustrated in the diagram of FIG. 14. Node B is the LCA of all genomes containing k-mer "AGT . . . " due to the isolated genome under node C, even though all remaining instances of the "AGT . . . " k-mer are within the subtree rooted at node A. Moreover, even if the genome at node C was not mislabeled, its isolation implies that the presence of the "AGT . . . " k-mer in a read is more indicative of organisms under node A. Therefore, excluding the genome containing the "AGT . . . " k-mer under node C might improve performance.

This method begins by accessing a classification database (e.g., RefSeq Complete) comprising a set of classified genomes (i.e., so-called "training" genomes). The classification database has a taxonomy. The taxonomy has a binary tree structure comprising nodes. An integer parameter T greater than zero is chosen (e.g., T=128). For a given k-mer of the set, no more than T genomes will be processed for the given k-mer during the database construction. For a large enough chosen T, the database construction procedure becomes the same as the above-described methods.

The set of classified genomes are processed in random order, one by one, while maintaining a look-up table of all of the k-mers of the set. For a given k-mer having unique identifier M (e.g., accession number), the look-up table contains i) a tree node $L_M$, which is the LCA of the nodes assigned to the already processed genomes containing given k-mer M and ii) the number $N_M$ of the processed genomes that contain given k-mer M. It should be understood that subscript M of $L_M$ and $N_M$ is the unique identifier of given k-mer M.

When a given genome G is processed, where G is a unique identifier (e.g., accession number) of the given genome, the look-up table is updated as follows. For a given k-mer M of given genome G, if $N_M<T$, then $N_M$ is increased by 1 and $L_M$ is set to the LCA of the node containing given genome G and the current $L_M$ (designated $L'_M$); otherwise nothing is done for given k-mer M. The process is repeated for each of the remaining k-mers of given genome G.

The above process is then repeated for each of the remaining genomes of the set, thereby producing a corrected look-up table.

The above process is likely to return $L_M$ as the LCA of the majority of genomes containing a given k-mer M, and it will be unlikely to return as $L_M$ a node $L'_M$ such that all but one instance of M appears in a subtree rooted at a child of $L'_M$.

Figure 15:
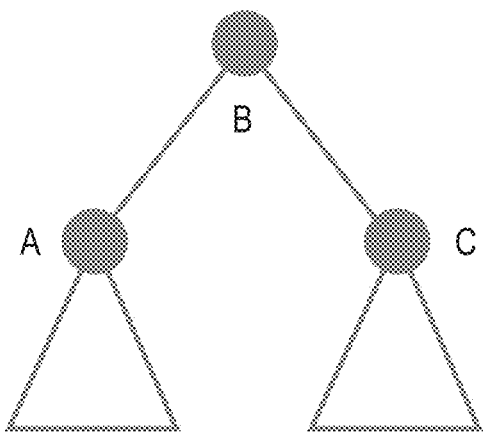
FIG. 15 is a portion of a tree diagram illustrating the effect of a k-mer being distributed equally and unequally between two nodes A and B.

In FIG. 15 (portion of a tree diagram), for example, suppose there are an equal number of instances of M in the subtrees rooted at A and C. Then after only a few genomes are processed in random order, and in particular before T have been, it is likely that an instance of M in the subtree rooted at A, and an instance of M in the subtree rooted at C, will have been processed. This would imply that B would be the LCA. If, on the other hand, there are 10T instances of M in the A subtree, and only one in the B subtree, then it is likely that more than T instances in the A subtree will be processed before the one in the B subtree is, so that the LCA found will be A.

General Considerations

The above-described methods of automatically identifying and correcting metadata errors apply to genome databases, gene databases, and protein databases. The metadata can be automatically identified and corrected across the entire taxonomic lineage, at the family level, at the genus level, at the species level, and/or at the strain level. The metadata errors that can be automatically identified and corrected include naming metadata and functional annotation metadata.

With respect to genome databases, the above methods allow genomes with unusual genotypes (e.g., chimeric genomes) to be automatically identified and correctly placed in a taxonomic graph based on the amount of new k-mer content. Likewise, genomes with unusual genotypes can be omitted from a taxonomic graph because they bring little or no new k-mer content, they cause too many k-mers to move up to lowest common ancestor nodes above a target rank (thereby degrading the precision of the database), and/or they contain a large proportion of non-specific k-mers (not useful for identification). Similarly, genomes can be included or excluded based on the ratio of new information (new k-mers) brought in to the number of k-mers they cause to move up to a LCA. This applies to databases used to identify an organism origin using DNA reads, for databases used to identify an organism origin using RNA reads, and for databases used to identify the number of unique k-mers representing a taxonomic unit.

The above-described methods also show that new genomes (for addition to a database) can be screened automatically by first running them through the database with contigs treated as reads.

The above-described methods also demonstrate an alternative method to constructing a k-mer database where decisions to LCA or not LCA a k-mer are based on statistical rules.

Microorganisms

Microorganisms include bacteria, fungi, viruses, protozoans, and parasites.

Exemplary non-limiting bacterial species include *Acetobacter aurantius, Acinetobacter baumannii, Actinomyces israelii, Agrobacterium radiobacter, Agrobacterium tumefaciens, Anaplasma phagocytophilum, Azorhizobium caulinodans, Azotobacter vinelandii, Bacillus anthracis, Bacillus brevis, Bacillus cereus, Bacillus fusiformis, Bacillus licheniformis, Bacillus megaterium, Bacillus mycoides, Bacillus stearothermophilus, Bacillus subtilis, Bacillus Thuringiensis, Bacteroides fragilis, Bacteroides gingivalis, Bacteroides melaninogenicus* (also known as *Prevotella melaninogenica*), *Bartonella henselae, Bartonella quintana, Bordetella, Bordetella bronchiseptica, Bordetella pertussis, Borrelia afzelii, Borrelia burgdorferi, Borrelia garinii, Borrelia recurrentis, Brucella abortus, Brucella canis, Brucella melitensis, Brucella suis, Burkholderia mallei, Burkholderia pseudomallei, Burkholderia cepacia, Calymmatobacterium granulomatis, Campylobacter, Campylobacter coli, Campylobacter fetus, Campylobacter j ejuni, Campylobacter pylori, Chlamydophila pneumoniae* (previously called *Chlamydia pneumoniae*), *Chlamydophila psittaci* (previously called *Chlamydia psittaci*), *Chlamydia trachomatis, Clostridium botulinum, Clostridium difficile, Clostridium perfringens* (previously called *Clostridium welchii*), *Clostridium tetani, Corynebacterium diphtheriae, Corynebacterium fusiforme, Coxiella burnetii, Ehrlichia canis, Ehrlichia chaffeensis, Enterobacter cloacae, Enterococcus avium, Enterococcus durans, Enterococcus faecalis, Enterococcus faecium, Enterococcus galllinarum, Enterococcus maloratus, Escherichia coli, Francisella tularensis, Fusobacterium nucleatum, Gardnerella vaginalis, Haemophilus ducreyi, Haemophilus influenzae, Haemophilus parainfluenzae, Haemophilus pertussis, Haemophilus vaginalis, Helicobacter pylori, Klebsiella pneumoniae, Lactobacillus acidophilus, Lactobacillus bulgaricus, Lactobacillus casei, Lactococcus lactis, Legionella pneumophila, Leptospira interrogans, Leptospira santarosai, Leptospira weilii, Leptospira noguchii, Listeria monocytogenes, Methanobacterium extroquens, Microbacterium multiforme, Micrococcus luteus, Moraxella catarrhalis, Mycobacterium avium, Mycobacterium bovis, Mycobacterium diphtheriae, Mycobacterium intracellulare, Mycobacterium leprae, Mycobacterium lepraemurium, Mycobacterium phlei, Mycobacterium smegmatis, Mycobacterium tuberculosis, Mycobacterium ulcerans, Mycoplasma fermentans, Mycoplasma genitalium, Mycoplasma hominis, Mycoplasma penetrans, Mycoplasma pneumoniae, Neisseria gonorrhoeae, Neisseria meningitidis, Pasteurella multocida, Pasteurella tularensis, Peptostreptococcus, Porphyromonas gingivalis, Prevotella melaninogenica* (previously called *Bacteroides melaninogenicus*), *Pseudomonas aeruginosa, Rhizobium radiobacter, Rickettsia prowazekii, Rickettsia psittaci, Rickettsia quintana, Rickettsia rickettsii, Rickettsia trachomae, Rochalimaea henselae, Rochalimaea quintana, Rothia dentocariosa, Salmonella enteritidis, Salmonella typhi, Salmonella typhimurium, Serratia marcescens, Shigella dysenteriae, Shigella sonnei, Spirillum volutans, Streptococcus agalactiae, Staphylococcus aureus, Staphylococcus epidermidis, Staphylococcus saprophyticus, Stenotrophomonas maltophilia, Streptococcus agalactiae, Streptococcus avium, Streptococcus bovis, Streptococcus cricetus, Streptococcus faceium, Streptococcus faecalis, Streptococcus ferus, Streptococcus gallinarum, Streptococcus lactis, Streptococcus mitior, Streptococcus mitis, Streptococcus mutans, Streptococcus oralis, Streptococcus pneumoniae, Streptococcus pyogenes, Streptococcus rattus, Streptococcus salivarius, Streptococcus sanguis, Streptococcus sobrinus, Streptococcus viridans, Treponema pallidum, Treponema denticola, Ureaplasma urealyticum, Vibrio cholerae, Vibrio comma, Vibrio parahaemolyticus, Vibrio vulnificus, Yersinia enterocolitica, Yersinia pestis, Yersinia pseudotuberculosis,*

Non-limiting exemplary viruses include Adenovirus, Herpes simplex, type 1, Herpes simplex, type 2, Varicella-zoster virus, Epstein-barr virus, Human cytomegalovirus, Human herpesvirus, type 8, Human papillomavirus, BK virus, JC virus, Smallpox, Hepatitis B virus, Parvovirus B19, Human astrovirus, Norwalk virus, coxsackievirus, hepatitis A virus, poliovirus, rhinovirus, Hepatitis C virus, yellow fever virus, dengue virus, West Nile virus, TBE virus, Rubella virus, Hepatitis E virus, Human immunodeficiency virus (HIV), Influenza virus, Lassa virus, Crimean-Congo hemorrhagic fever virus, Hantaan virus, Ebola virus, Marburg virus, Measles virus, Mumps virus, Parainfluenza virus, Respiratory syncytial virus, Rabies virus, Rotavirus, Orbivirus, Coltivirus, Banna virus, and zika virus.

Non-limiting exemplary fungi include *Candida albicans, Aspergillus fumigatus, Aspergillus flavus, Aspergillus clavatus, Cryptococcus neoformans, Cryptococcus laurentii, Cryptococcus albidus, Cryptococcus gattii, Hi stoplasma capsulatum, Pneumocystis jirovecii, Pneumocystis carinii,* and *Stachybotrys chartarurn.*

Non-limiting exemplary protozoa include *Entamoeba histolytica, Entamoeba coli, Entamoeba dispar, Entamoeba moshkovskii, Entamoeba Bangladeshi, Entamoeba hartmanni, Dientamoeba fragilis, Endolimax nana, lodarnoeba butschlii, Plasmodium malariae, Plasmodium falciparum, Plasmodium vivax, Plasmodium ovale, Naegleria fowleri, Acanthamoeba species, Balamuthia mandrillaris, Sappinia diploidea, Giardia larnblia, Giardia intestinalis, Giardia duodenalis, Toxoplasma gondii, Nippostrongylus brasiliensis, Cryptosporidium parvum, Cryptosporidium hominis, Cryptosporidium cams, Cryptosporidium felis, Cryptosporidium meleagridis, Cryptosporidium muris, Trichomonas vaginalis, Trypanosoma cruzi, Leishmania major, Leishmania tropica, Leishmania barziliensis, Leishmania mexicana, Leishmania guyanesis, Leishmania panamensis,* and *Trypanosoma brucei.*

Sequencing

Non-limiting methods of DNA/RNA sequencing include massively parallel signature sequencing (or MPSS), Polony sequencing, 454 pyrosequencing method, Illumina (Solexa) sequencing, SOLiD sequencing, ion semiconductor sequencing, DNA nanoball sequencing, heliscope sequencing, single molecule real time sequencing (SMRT sequencing), solid state nanopore sequencing, protein based nanopore sequencing, sequencing by electrical tunneling currents, sequencing by matrix-assisted laser desorption ionization time-of-flight mass spectrometry (MALDI-TOF MS), microfluidic Sanger sequencing, transmission electron microscopy DNA sequencing, RNA polymerase (RNAP) sequencing method, in vitro virus high throughput sequencing (IVV-HiTSeq), and sequencing by hybridization. Multiple, fragmented sequence reads must be assembled together on the basis of their overlapping areas.

The foregoing methods can be used singularly or in combination. The sequencing methods can be applied to genome sequencing, genome resequencing, transcriptome profiling (RNA-Seq), DNA-protein interactions (ChIP-sequencing), and epigenome characterization. Preferably, the sequencing method(s) operates in a parallel mode (characterizing many sequences concurrently).

Computer Hardware and Software

The computer system for implementing the present invention can take the form of an entirely hardware embodiment, an entirely software embodiment (including firmware, resident software, microcode, etc.), or a combination of software and hardware that may all generally be referred to herein as a "circuit," "module," or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 16:
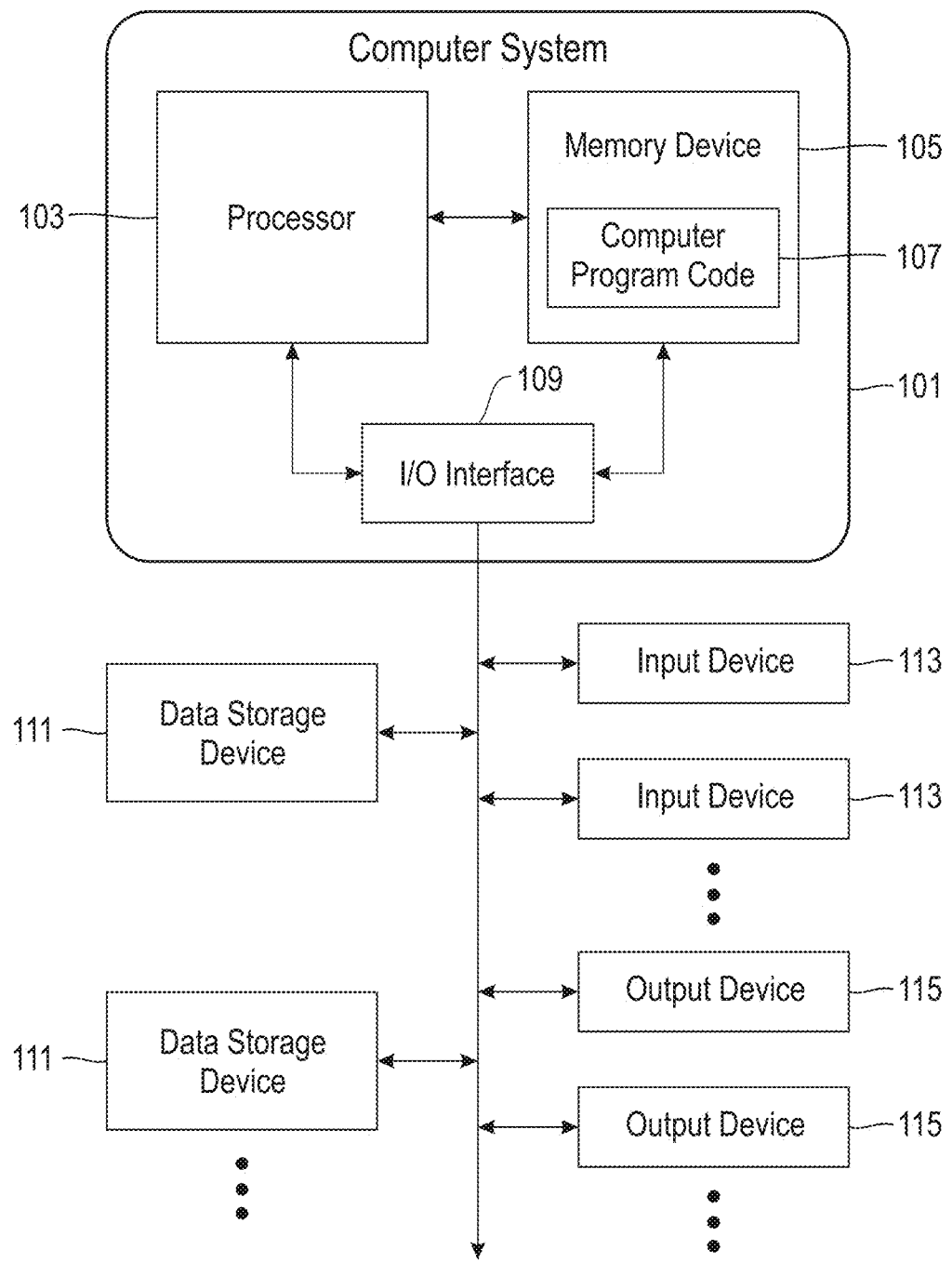
FIG. 16 is a block diagram of a computer system for implementing the disclosed methods.

FIG. 16 shows a structure of a computer system and computer program code that may be used to implement a method of processing, including natural-language processing, to automatically and self-consistently correct taxonomic classifications of a k-mer database and perform other processes disclosed herein. In FIG. 16, computer system 101 comprises a processor 103 coupled through one or more I/O Interfaces 109 to one or more hardware data storage devices 111 and one or more I/O devices 113 and 115. Hardware data storage devices 111 can contain, for example, the reference k-mer database and the self-consistent k-mer database having the corrected taxonomic classifications.

Hardware data storage devices 111 may include, but are not limited to, magnetic tape drives, fixed or removable hard disks, optical discs, storage-equipped mobile devices, and solid-state random-access or read-only storage devices. I/O devices may comprise, but are not limited to: input devices 113, such as keyboards, scanners, handheld telecommunications devices, touch-sensitive displays, tablets, biometric readers, joysticks, trackballs, or computer mice; and output devices 115, which may comprise, but are not limited to printers, plotters, tablets, mobile telephones, displays, or sound-producing devices. Data storage devices 111, input devices 113, and output devices 115 may be located either locally or at remote sites from which they are connected to I/O Interface 109 through a network interface.

Processor 103 may also be connected to one or more memory devices 105, which may include, but are not limited to, Dynamic RANI (DRAM), Static RANI (SRAM), Programmable Read-Only Memory (PROM), Field-Programmable Gate Arrays (FPGA), Secure Digital memory cards, SIM cards, or other types of memory devices.

At least one memory device 105 contains stored computer program code 107, which is a computer program that comprises computer-executable instructions. The stored computer program code can include a program for natural-language processing that implements the disclosed methods. The data storage devices 111 may store the computer program code 107. Computer program code 107 stored in the storage devices 111 can be configured to be executed by processor 103 via the memory devices 105. Processor 103 can execute the stored computer program code 107.

Thus the present invention discloses a process for supporting computer infrastructure, integrating, hosting, maintaining, and deploying computer-readable code into the computer system 101, wherein the code in combination with the computer system 101 is capable of performing the disclosed methods.

Any of the components of the present invention could be created, integrated, hosted, maintained, deployed, managed, serviced, supported, etc. by a service provider. Thus, the present invention discloses a process for deploying or integrating computing infrastructure, comprising integrating computer-readable code into the computer system 101, wherein the code in combination with the computer system 101 is capable of performing the disclosed methods.

One or more data storage units 111 (or one or more additional memory devices not shown in FIG. 16) may be used as a computer-readable hardware storage device having a computer-readable program embodied therein and/or having other data stored therein, wherein the computer-readable program comprises stored computer program code 107. Generally, a computer program product (or, alternatively, an article of manufacture) of computer system 101 may comprise said computer-readable hardware storage device.

While it is understood that program code 107 may be deployed by manually loading the program code 107 directly into client, server, and proxy computers (not shown) by loading the program code 107 into a computer-readable storage medium (e.g., computer data storage device 111), program code 107 may also be automatically or semi-automatically deployed into computer system 101 by sending program code 107 to a central server (e.g., computer system 101) or to a group of central servers. Program code 107 may then be downloaded into client computers (not shown) that will execute program code 107.

Alternatively, program code 107 may be sent directly to the client computer via e-mail. Program code 107 may then either be detached to a directory on the client computer or loaded into a directory on the client computer by an e-mail option that selects a program that detaches program code 107 into the directory.

Another alternative is to send program code 107 directly to a directory on the client computer hard drive. If proxy servers are configured, the process selects the proxy server code, determines on which computers to place the proxy servers' code, transmits the proxy server code, and then installs the proxy server code on the proxy computer. Program code 107 is then transmitted to the proxy server and stored on the proxy server.

In one embodiment, program code 107 is integrated into a client, server and network environment by providing for program code 107 to coexist with software applications (not shown), operating systems (not shown) and network operating systems software (not shown) and then installing program code 107 on the clients and servers in the environment where program code 107 will function.

The first step of the aforementioned integration of code included in program code 107 is to identify any software including the network operating system (not shown), which is required by program code 107 or that works in conjunction with program code 107 and is on the clients and servers where program code 107 will be deployed. This identified software includes the network operating system, where the network operating system comprises software that enhances a basic operating system by adding networking features. Next, the software applications and version numbers are identified and compared to a list of software applications and correct version numbers that have been tested to work with program code 107. A software application that is missing or that does not match a correct version number is upgraded to the correct version.

A program instruction that passes parameters from program code 107 to a software application is checked to ensure that the instruction's parameter list matches a parameter list required by the program code 107. Conversely, a parameter passed by the software application to program code 107 is checked to ensure that the parameter matches a parameter required by program code 107. The client and server operating systems, including the network operating systems, are identified and compared to a list of operating systems, version numbers, and network software programs that have been tested to work with program code 107. An operating system, version number, or network software program that does not match an entry of the list of tested operating systems and version numbers is upgraded to the listed level on the client computers and upgraded to the listed level on the server computers.

After ensuring that the software, where program code 107 is to be deployed, is at a correct version level that has been tested to work with program code 107, the integration is completed by installing program code 107 on the clients and servers.

Embodiments of the present invention may be implemented as a method performed by a processor of a computer system, as a computer program product, as a computer system, or as a processor-performed process or service for supporting computer infrastructure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. When a range is used to express a possible value using two numerical limits X and Y (e.g., a concentration of X ppm to Y ppm), unless otherwise stated the value can be X, Y, or any number between X and Y.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and their practical application, and to enable others of ordinary skill in the art to understand the invention.

What is claimed is:

1. A method, comprising:
providing a first database comprising genomes of one or more organisms, the genomes assigned respective taxonomic IDs corresponding to nodes of a self-consistent first taxonomy, IDs meaning identifications, the first taxonomy calculated on the basis of genetic distance, a given taxonomic ID comprising one or more of the genomes, one or more of the genomes containing respective metadata of a reference taxonomy, the reference taxonomy not based on genetic distance, the genomes of at least one taxonomic ID of the first taxonomy separable into one or more clusters based on differences in taxonomic labeling in the metadata;
defining a minimum cluster size Cmin of each taxonomic ID of the first taxonomy wherein Cmin means number of genomes of a cluster, and Cmin is a positive whole number greater than 0;
removing from the first database all genomes of clusters having a cluster size less than Cmin, thereby generating i) a set of remaining genomes and ii) a set of removed genomes;
calculating a self-consistent second taxonomy based on genetic distances of each pair of the remaining genomes;
generating a second database comprising the remaining genomes, the remaining genomes assigned taxonomic IDs corresponding to nodes of the second taxonomy;
classifying each of the removed genomes in the second taxonomy, thereby forming i) a set of mapped genomes assigned to nodes of the second taxonomy and ii) a set of unmapped genomes;
correcting the metadata of the mapped genomes to match the nodes assigned to the mapped genomes of the second taxonomy; and
adding one or more of the mapped genomes having new k-mer content to the second database, thereby forming a third database, the third database having greater specificity for taxonomic profiling compared to the first database;
wherein
the first database, second database, and third database comprise k-mers of their respective genomes,
the first database, the second database, and the third database are stored on a computer readable medium, and
the method is capable of being performed automatically and iteratively by a computer system.

2. The method of claim 1, wherein k-mers of a mapped genome are added to one leaf node of the second taxonomy, the k-mers added to the one leaf node are assigned a taxonomic ID corresponding to the one leaf node, and the metadata of the mapped genome of the one leaf node is automatically corrected to match the assigned taxonomic ID.

3. The method of claim 1, wherein the one or more organisms are prokaryotes.

4. The method of claim 1, wherein the genomes of the first taxonomy and the second taxonomy are assigned taxonomic IDs exclusively based on genetic distance.

5. The method of claim 1, wherein the genetic distances are selected from the group consisting of genome-genome distances, gene-gene distances, protein domain-protein domain distances, and protein-protein distances.

6. The method of claim 1, wherein the genetic distances are calculated between pairs of the genomes assembled from the nucleic acid sequences.

7. The method of claim 1, wherein the genetic distances are genome-genome distances calculated using the MinHash algorithm.

8. The method of claim 1, wherein the genetic distances are genome-genome distances calculated using Meier-Koltoff algorithm.

9. The method of claim 1, wherein the genetic distances are gene-gene distances calculated using Nei's standard genetic distance.

10. The method of claim 1, wherein the genetic distances are gene-gene distances calculated using pairwise distance method.

11. The method of claim 1, wherein the genetic distances are protein domain-protein domain distances.

12. The method of claim 1, wherein the remaining genomes are assigned to nodes of the second taxonomy using an agglomerative hierarchical algorithm.

13. The method of claim 12, wherein the agglomerative hierarchical algorithm is selected from the group consisting of i) single linkage (SLINK), ii) complete linkage (CLINK), iii) unweighted pair-group method using arithmetic averages (UPGMA), iv) weighted arithmetic average clustering (WPGMA), v) Ward method, vi) unweighted centroid clustering (UPGMC) and vii) weighted centroid clustering (WPGMC).

14. The method of claim 1, wherein one or more of the k-mers of the first database, second database, and third database are individually linked to one or more reference IDs of a reference taxonomy.

15. A system comprising one or more computer processor circuits configured and arranged to:
provide a first database comprising genomes of one or more organisms, the genomes assigned respective taxonomic IDs corresponding to nodes of a self-consistent first taxonomy, IDs meaning identifications, the first taxonomy calculated on the basis of genetic distance, a given taxonomic ID comprising one or more of the genomes, one or more of the genomes containing respective metadata of a reference taxonomy, the reference taxonomy not based on genetic distance, the genomes of at least one taxonomic ID of the first taxonomy separable into one or more clusters based on differences in taxonomic labeling in the metadata;
define a minimum cluster size Cmin of each taxonomic ID of the first taxonomy wherein Cmin means number of genomes of a cluster, and Cmin is a positive whole number greater than 0;
remove from the first database all genomes of clusters having a cluster size less than Cmin, thereby generating i) a set of remaining genomes and ii) a set of removed genomes;
calculate a self-consistent second taxonomy based on genetic distances of each pair of the remaining genomes;
generate a second database comprising the remaining genomes, the remaining genomes assigned taxonomic IDs corresponding to nodes of the second taxonomy;
classify each of the removed genomes in the second taxonomy, thereby forming i) a set of mapped genomes assigned to nodes of the second taxonomy and ii) a set of unmapped genomes;
correct the metadata of the mapped genomes to match the nodes assigned to the mapped genomes of the second taxonomy; and
add one or more of the mapped genomes having new k-mer content to the second database, thereby forming a third database, the third database having greater specificity for taxonomic profiling compared to the first database;

wherein
the first database, second database, and third database comprise k-mers of their respective genomes, and the mapped genomes comprise k-mers not present in the second database
the first database, the second database, and the third database are stored on a computer readable medium, and
the method is capable of being performed automatically and iteratively by a computer system.

16. The system of claim 15, wherein the system is suitable for taxonomic profiling of a microbiome.

17. A computer program product, comprising a computer readable hardware storage device having a computer-readable program code stored therein, said program code configured to be executed by a processor of a computer system to implement a method comprising:
providing a first database comprising genomes of one or more organisms, the genomes assigned respective taxonomic IDs corresponding to nodes of a self-consistent first taxonomy, IDs meaning identifications, the first taxonomy calculated on the basis of genetic distance, a given taxonomic ID comprising one or more of the genomes, one or more of the genomes containing respective metadata of a reference taxonomy, the reference taxonomy not based on genetic distance, the genomes of at least one taxonomic ID of the first taxonomy separable into one or more clusters based on differences in taxonomic labeling in the metadata;
defining a minimum cluster size Cmin of each taxonomic ID of the first taxonomy wherein Cmin means number of genomes of a cluster, and Cmin is a positive whole number greater than 0;
removing from the first database all genomes of clusters having a cluster size less than Cmin, thereby generating i) a set of remaining genomes and ii) a set of removed genomes;
calculating a self-consistent second taxonomy based on genetic distances of each pair of the remaining genomes;
generating a second database comprising the remaining genomes, the remaining genomes assigned taxonomic IDs corresponding to nodes of the second taxonomy;
classifying each of the removed genomes in the second taxonomy, thereby forming i) a set of mapped genomes assigned to nodes of the second taxonomy and ii) a set of unmapped genomes;

correcting the metadata of the mapped genomes to match the nodes assigned to the mapped genomes of the second taxonomy; and adding one or more of the mapped genomes having new k-mer content to the second database, thereby forming a third database, the third database having greater specificity for taxonomic profiling compared to the first database;

wherein
the first database, second database, and third database comprise k-mers of their respective genomes,
the first database, the second database, and the third database are stored on a computer readable medium, and
the method is capable of being performed automatically and iteratively by a computer system.

18. A method, comprising:
accessing sequenced nucleic acids of a given sample genome;
selecting a taxonomic target rank from the group consisting of domain, kingdom, division, phylum, class, order, family, genus, species, sub-species, and strain;
forming contigs of the sequenced nucleic acids of the given sample genome;
classifying the contigs using a k-mer based classifier against a self-consistent first taxonomy of a first database, the first taxonomy based on genetic distance, the first database comprising genomes of one or more organisms, wherein each contig is treated as one read;
calculating $N_k$, defined as the sum of new k-mers of the given sample genome not in the first database, wherein $N_k$ has a value greater than or equal to 0;
identifying a primary node of the given sample genome in the first taxonomy, wherein the primary node has more k-mers of the given sample genome at the target rank compared to other nodes at the target rank;
calculating $Y_k$, defined as the sum of k-mers of the given sample genome classified to nodes of the first taxonomy at the target rank other than the primary node; and
adding the given sample genome to the first database based on a ratio of $N_k:Y_k$ equaling or exceeding a preselected value greater than or equal to 4:1, thereby forming a second database.

19. The method of claim 18, wherein the preselected value of the ratio of $N_k:Y_k$ is greater than or equal to 10:1.

20. A computer program product, comprising a computer readable hardware storage device having a computer-readable program code stored therein, said program code configured to be executed by a processor of a computer system to implement a method comprising:
accessing sequenced nucleic acids of a given sample genome;
selecting a taxonomic target rank from the group consisting of domain, kingdom, division, phylum, class, order, family, genus, species, sub-species, and strain;
forming contigs of the sequenced nucleic acids of the given sample genome;
classifying the contigs using a k-mer based classifier against a self-consistent first taxonomy of a first database, the first taxonomy based on genetic distance, the first database comprising genomes of one or more organisms, wherein each contig is treated as one read;
calculating $N_k$, defined as the sum of new k-mers of the given sample genome not in the first database, wherein $N_k$ has a value greater than or equal to 0;
identifying a primary node of the given sample genome in the first taxonomy, wherein the primary node has more k-mers of the given sample genome at the target rank compared to other nodes at the target rank;
calculating $Y_k$, defined as the sum of k-mers of the given sample genome classified to nodes of the first taxonomy at the target rank other than the primary node; and
adding the given sample genome to the first database based on a ratio of $N_k:Y_k$ equaling or exceeding a preselected value greater than or equal to 4:1, thereby forming a second database.

21. A system comprising one or more computer processor circuits configured and arranged to:
access sequenced nucleic acids of a given sample genome;
select a taxonomic target rank from the group consisting of domain, kingdom, division, phylum, class, order, family, genus, species, sub-species, and strain;
form contigs of the sequenced nucleic acids of the given sample genome;
classify the contigs using a k-mer based classifier against a self-consistent first taxonomy of a first database, the first taxonomy based on genetic distance, the first database comprising genomes of one or more organisms, wherein each contig is treated as one read;
calculate $N_k$, defined as the sum of new k-mers of the given sample genome not in the first database, wherein $N_k$ has a value greater than or equal to 0;
identify a primary node of the given sample genome in the first taxonomy, wherein the primary node has more k-mers of the given sample genome at the target rank compared to other nodes at the target rank;
calculate $Y_k$, defined as the sum of k-mers of the given sample genome classified to nodes of the first taxonomy at the target rank other than the primary node; and
add the given sample genome to the first database for $N_k:Y_k$ greater than or equal to 4:1, thereby forming a second database.

22. A method, comprising:
accessing a classification database comprising a set of classified genomes, the classification database having a taxonomy, the taxonomy having a binary tree structure comprising nodes, the set of genomes classified to respective nodes;
selecting an upper limit of the number of genomes of the set that can be processed for any given k-mer of the set, designated T, wherein T is a positive whole number greater than or equal to 1;
updating a look-up table in a computer process, the look-up table containing i) the k-mers of the set, ii) respective lowest common ancestor nodes of the k-mers, and iii) respective number of processed genomes of the set containing the k-mers, the respective number of processed genomes of the set initially being zero, the process comprising:
a) selecting randomly a given genome G of the set,
b) selecting a given k-mer M of given genome G, wherein M is a unique identifier, the given k-mer M has a lowest common ancestor $L_M$, the given k-mer M has a number of processed genomes $N_M$ of the set containing the given k-mer M, and $N_M$ has a value greater than or equal to 0 and less than or equal to T,
c) determining the lowest common ancestor of given genome G and $L_M$, designated $L'_M$, d) setting $L_M$ of the given k-mer M to $L'_M$ and increasing $N_M$ by 1 for $N_M$ of the given k-mer M less than T, e) repeating steps b) to d) for each remaining k-mer of the given genome G, and f) repeating steps a) to e) for each remaining genome of the set, thereby forming an updated look-up table; and updating the classification database with $L_M$ and $N_M$ of each of the k-mers of the set from the updated look-up table, thereby forming a corrected classification database.

23. A computer program product, comprising a computer readable hardware storage device having a computer-readable program code stored therein, said program code configured to be executed by a processor of a computer system to implement a method comprising:

accessing a classification database comprising a set of classified genomes, the classification database having a taxonomy, the taxonomy having a binary tree structure comprising nodes, the set of genomes classified to respective nodes;

selecting an upper limit of the number of genomes of the set that can be processed for any given k-mer of the set, designated T, wherein T is a positive whole number greater than or equal to 1;

updating a look-up table in a computer process, the look-up table containing i) the k-mers of the set, ii) respective lowest common ancestor nodes of the k-mers, and iii) respective number of processed genomes of the set containing the k-mers, the respective number of processed genomes of the set initially being zero, the process comprising:

a) selecting randomly a given genome G of the set, b) selecting a given k-mer M of given genome G, wherein M is a unique identifier, the given k-mer M has a lowest common ancestor $L_M$, the given k-mer M has a number of processed genomes $N_M$ of the set containing the given k-mer M, and $N_M$ has a value greater than or equal to 0 and less than or equal to T, c) determining the lowest common ancestor of given genome G and $L_M$, designated $L'_M$, d) setting $L_M$ of the given k-mer M to $L'_M$ and increasing $N_M$ by 1 for $N_M$ of the given k-mer M less than T, e) repeating steps b) to d) for each remaining k-mer of the given genome G, and f) repeating steps a) to e) for each remaining genome of the set, thereby forming an updated look-up table; and updating the classification database with $L_M$ and $N_M$ of each of the k-mers of the set from the updated look-up table, thereby forming a corrected classification database.

24. A system comprising one or more computer processor circuits configured and arranged to:

access a classification database comprising a set of classified genomes, the classification database having a taxonomy, the taxonomy having a binary tree structure comprising nodes, the set of genomes classified to respective nodes;

select an upper limit of the number of genomes of the set that can be processed for any given k-mer of the set, designated T, wherein T is a positive whole number greater than or equal to 1;

update a look-up table in a computer process, the look-up table containing i) the k-mers of the set, ii) respective lowest common ancestor nodes of the k-mers, and iii) respective number of processed genomes of the set containing the k-mers, the respective number of processed genomes of the set initially being zero, the process comprising:

a) selecting randomly a given genome G of the set, b) selecting a given k-mer M of given genome G, wherein M is a unique identifier, the given k-mer M has a lowest common ancestor $L_M$, the given k-mer M has a number of processed genomes $N_M$ of the set containing the given k-mer M, and $N_M$ has a value greater than or equal to 0 and less than or equal to T, c) determining the lowest common ancestor of given genome G and $L_M$, designated $L'_M$, d) setting $L_M$ of the given k-mer M to $L'_M$ and increasing $N_M$ by 1 for $N_M$ of the given k-mer M less than T, e) repeating steps b) to d) for each remaining k-mer of the given genome G, and f) repeating steps a) to e) for each remaining genome of the set, thereby forming an updated look-up table; and update the classification database with $L_M$ and $N_M$ of each of the k-mers of the set from the updated look-up table, thereby forming a corrected classification database.

* * * * *